United States Patent
Butt et al.

(10) Patent No.: US 11,940,589 B2
(45) Date of Patent: Mar. 26, 2024

(54) ANALYZING BOREHOLE PATHS USING STRATIGRAPHIC TURNING POINTS

(71) Applicant: Landmark Graphics Corporation, Houston, TX (US)

(72) Inventors: Alice Butt, Abingdon (GB); Mykhailo Ponomarev, Houston, TX (US); Einar Mageroy, Stavanger (NO)

(73) Assignee: Landmark Graphics Corporation, Inc., Houston, TX (US)

( * ) Notice: Subject to any disclaimer, the term of this patent is extended or adjusted under 35 U.S.C. 154(b) by 3 days.

(21) Appl. No.: 17/852,982

(22) Filed: Jun. 29, 2022

(65) Prior Publication Data

US 2024/0004101 A1  Jan. 4, 2024

(51) Int. Cl.
  *G01V 3/38* (2006.01)
  *E21B 47/02* (2006.01)
  *E21B 47/022* (2012.01)
  *G01V 1/40* (2006.01)

(52) U.S. Cl.
  CPC .............. *G01V 3/38* (2013.01); *E21B 47/022* (2013.01); *G01V 1/40* (2013.01)

(58) Field of Classification Search
  CPC ........... E21B 47/022; G01V 1/40; G01V 3/38
  See application file for complete search history.

(56) References Cited

U.S. PATENT DOCUMENTS

| | | | |
|---|---|---|---|
| 5,311,951 A | 5/1994 | Kyte et al. | |
| 8,473,212 B2 | 6/2013 | Tabanou et al. | |
| 10,400,590 B1 * | 9/2019 | Aldred | E21B 49/00 |

(Continued)

FOREIGN PATENT DOCUMENTS

| | | |
|---|---|---|
| CN | 111983674 A | 11/2020 |
| FR | 2994314 B1 | 12/2015 |

(Continued)

OTHER PUBLICATIONS

Berg, et al.; "Geosteering Using True Stratigraphic Thickness"; Unconventional Resources Technology Conference; Aug. 12, 2013; 16 pgs.

(Continued)

*Primary Examiner* — Mohamed Charioui
*Assistant Examiner* — Lynda Dinh
(74) *Attorney, Agent, or Firm* — Michael Jenney; Parker Justiss, P.C.

(57) ABSTRACT

Turning points in stratigraphy (TPS) can be determined, which then can be used to improve the representation of the borehole path in relation to layers of the subterranean formation. The TPS can be determined by analyzing each directional survey point in relation to the nearest layer of the subterranean formation. In determining which layer is the nearest layer, the process can analyze the layer type, such as conformable or unconformable, whether a fault intersects the borehole, the angle of the layer in relation to the borehole path, or whether the true stratigraphic thickness (TST) changes from one of a positive parameter or negative parameter to the other. The generated TPS can be used by a system as input or can be displayed for a user where the segmented borehole path can be aligned using the calculated TST to improve the ability of the user to analyze the representation.

23 Claims, 17 Drawing Sheets

(56) References Cited

U.S. PATENT DOCUMENTS

| | | |
|---|---|---|
| 10,422,924 B2 | 9/2019 | Zhang et al. |
| 11,435,499 B1* | 9/2022 | Peredriy .............. G01V 99/005 |
| 2015/0240616 A1* | 8/2015 | Woodward ............. G05B 15/02 |
| | | 700/275 |
| 2018/0283149 A1 | 10/2018 | Vittoratos et al. |
| 2019/0302307 A1 | 10/2019 | Arbus |
| 2021/0319304 A1* | 10/2021 | Tawil ....................... G01V 1/48 |
| 2022/0187496 A1* | 6/2022 | Mishchenko ........... G06T 17/20 |

FOREIGN PATENT DOCUMENTS

| | | |
|---|---|---|
| RU | 2652172 C2 | 4/2018 |
| SA | 516371481 B1 | 2/2019 |

OTHER PUBLICATIONS

Lindquist; "Practical characterization of eolian reservoirs for development: Nugget Sandstone, Utah-Wyoming thrust belt"; Sedimentary Geology; Apr. 22, 2003; vol. 56, Issues 1-4; 28 pgs.

Tearpock, et al.; "Applied Subsurface Geological Mapping with Structural Methods"; 2nd Edition Book; Introduction pages, p. 56, p. 90, p. 93, and p. 783; 2002; 7 pgs.

* cited by examiner

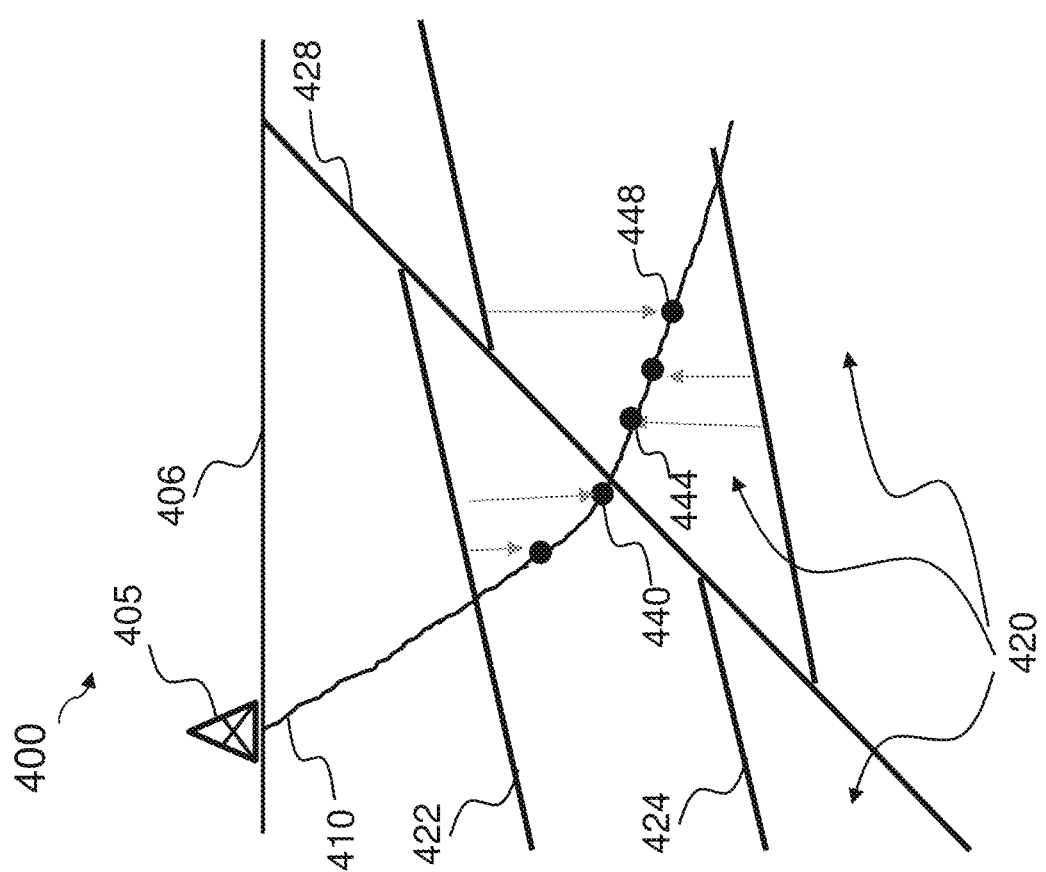

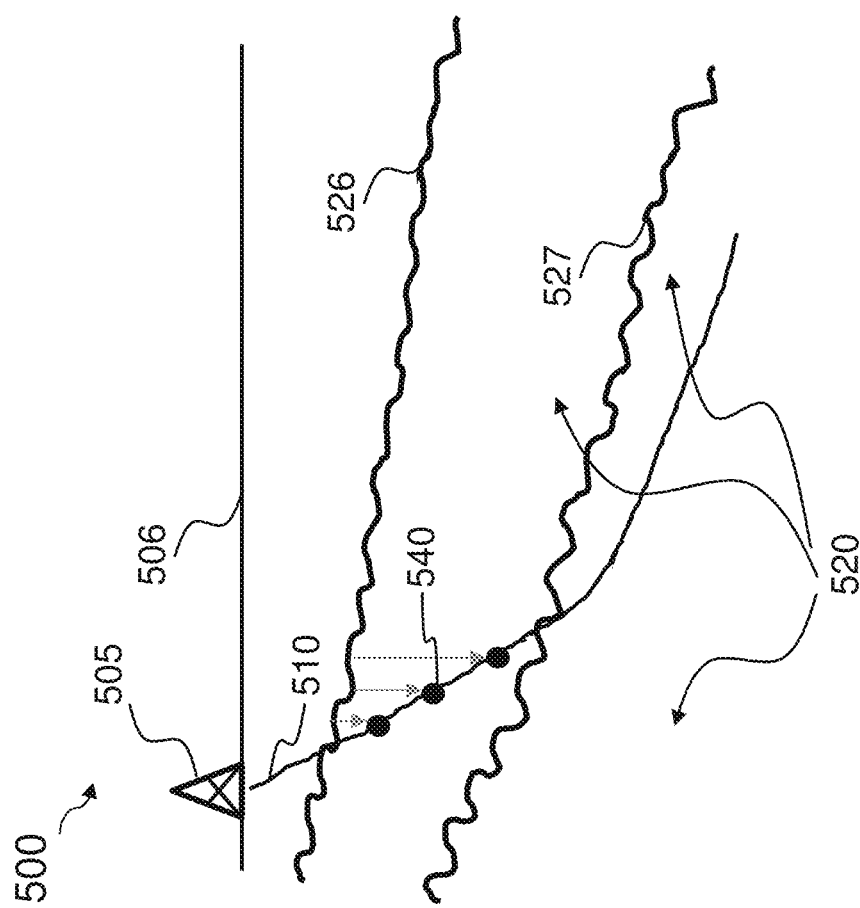

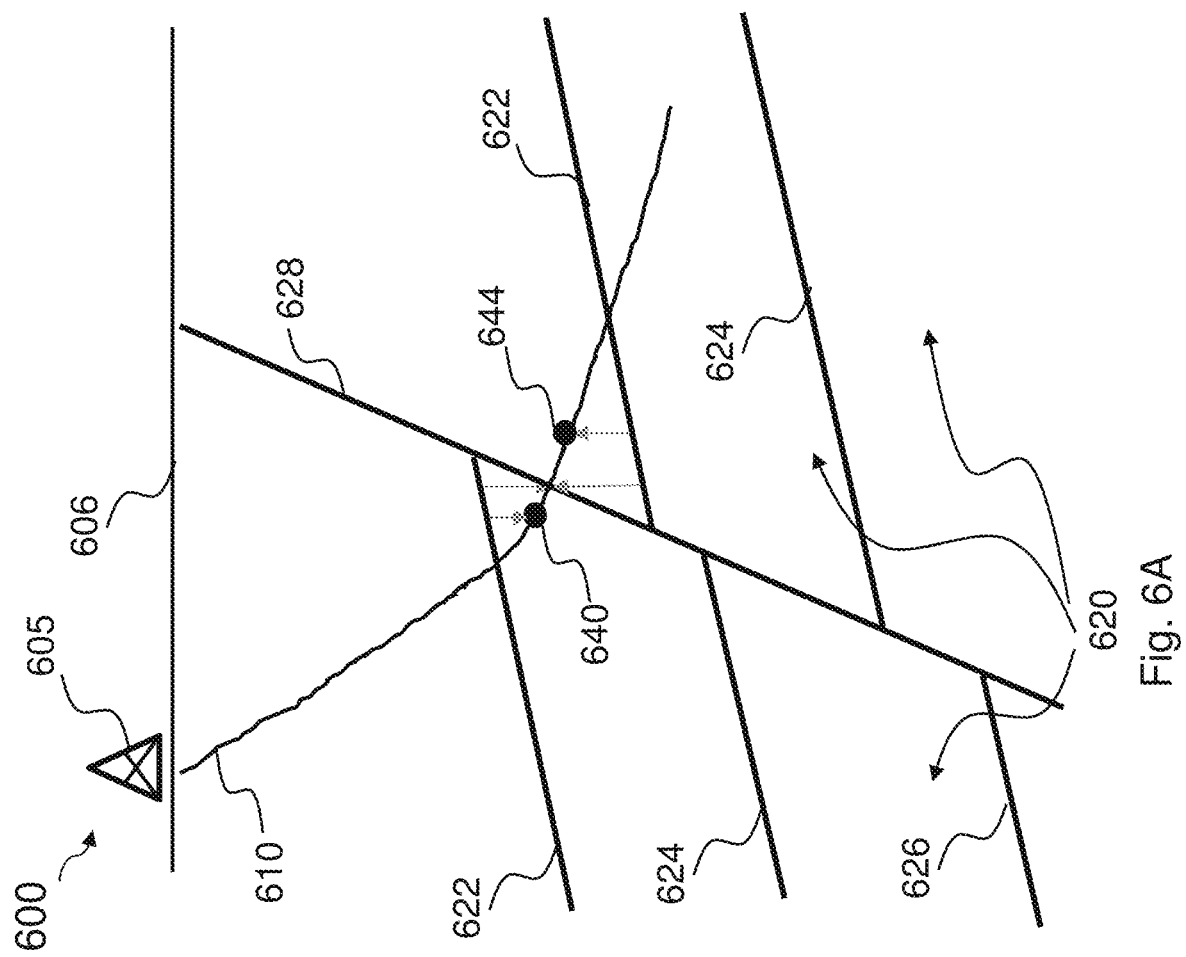

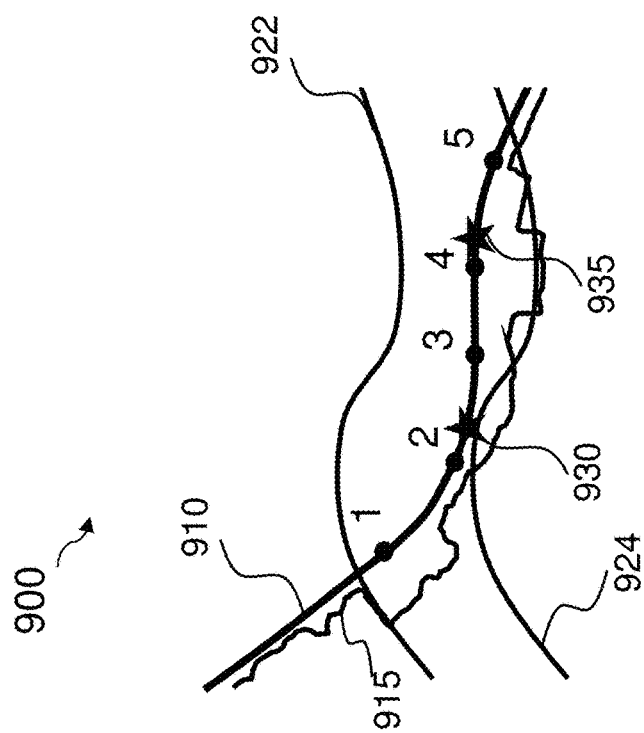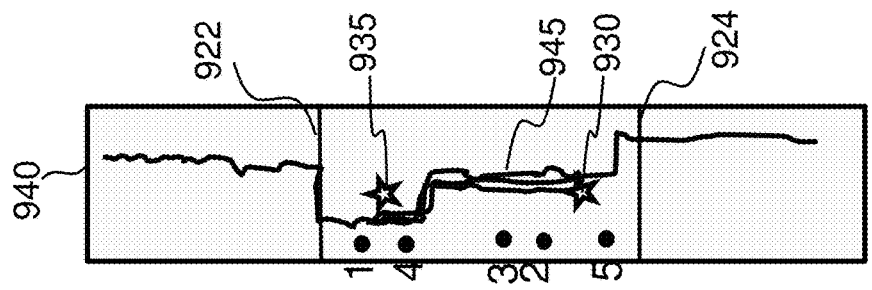

ANALYZING BOREHOLE PATHS USING STRATIGRAPHIC TURNING POINTS

TECHNICAL FIELD

This application is directed, in general, to identifying a borehole path through a subterranean formation and, more specifically, to relating stratigraphy information to the borehole path.

BACKGROUND

In developing a borehole, such as for hydrocarbon production, scientific purposes, or other purposes, it can be important to know the relative position of the borehole path through various layers of the subterranean formation. As layers of the subterranean formation can fold, bend, or otherwise deform, maintaining an alignment of the borehole path to the desired or planned path can be difficult. In aspects where a layer of the subterranean formation indicates potential benefits, such as hydrocarbon reserves, knowing the positioning of the borehole path to that layer can be important to the cost effectiveness of developing the borehole. It would be beneficial to improve the operational ability to determine the borehole path in relation to the various layers of the subterranean formation.

SUMMARY

In one aspect, a method is disclosed. In one embodiment, the method includes (1) receiving a set of directional survey points and input parameters, wherein the set of directional survey points is collected from a borehole along a borehole path, and the input parameters include stratigraphic data on one or more layers of a subterranean formation where the borehole path is through the subterranean formation, (2) calculating a set of intersection points of the borehole path and the one or more layers of the subterranean formation, (3) determining a layer type of each layer in the one or more layers of the subterranean formation, where the layer type is one of conformable or unconformable, (4) calculating a TST, using the layer type, between a selected layer of the one or more layers and the borehole path, wherein one or more of the TST is calculated at each directional survey point in the set of directional survey points forming a set of TST, (5) computing a TST difference between adjacent TSTs in the set of TST forming a set of TST differences, wherein the adjacent TSTs are determined using a location for each of the TST along the borehole path, where the location is determined using the set of directional survey points, and (6) generating a set of TPS using the set of TST differences.

In a second aspect, a system is disclosed. In one embodiment, the system includes (1) a data transceiver, capable of receiving a set of directional survey points and input parameters, wherein the set of directional survey points is collected along a borehole path of a borehole, where the borehole path is located through a subterranean formation, and (2) a stratigraphic processor, capable of communicating with the data transceiver, calculating intersection points between the borehole and one or more layers of the subterranean formation, determining layer types of the one or more layers, calculating a set of TSTs between a layer of the one or more layers and each directional survey point in the set of directional survey points, calculating a set of TST differences using the set of TSTs that are adjacent, and calculating a set of TPS using the set of TST differences and the input parameters.

In a third aspect, a computer program product having a series of operating instructions stored on a non-transitory computer-readable medium that directs a data processing apparatus when executed thereby to perform operations to determine one or more TPS is disclosed. In one embodiment, the operations include (1) receiving a set of directional survey points and input parameters, wherein the set of directional survey points is collected from a borehole along a borehole path, and the input parameters include stratigraphic data on one or more layers of a subterranean formation where the borehole path is through the subterranean formation, (2) calculating a set of intersection points of the borehole path and the one or more layers of the subterranean formation, (3) determining a layer type of each layer in the one or more layers of the subterranean formation, where the layer type is one of conformable or unconformable, (4) calculating a TST, using the layer type, between a selected layer of the one or more layers and the borehole path, wherein one or more of the TST is calculated at each directional survey point in the set of directional survey points forming a set of TST, (5) computing a TST difference between adjacent TSTs in the set of TST forming a set of TST differences, wherein the adjacent TSTs are determined using a location for each of the TST along the borehole path, where the location is determined using the set of directional survey points, and (6) generating a set of TPS using the set of TST differences.

BRIEF DESCRIPTION

Reference is now made to the following descriptions taken in conjunction with the accompanying drawings, in which:

FIG. 4A is an illustration of a diagram of an example fault system;

FIG. 5A is an illustration of a diagram of an example multiple unconformable layers;

FIG. 6A is an illustration of a diagram of an example borehole system;

FIG. 9A is an illustration of a diagram of an example borehole data segmentation;

FIG. 9B is an illustration of a diagram of an example borehole data segmentation with borehole data;

DETAILED DESCRIPTION

Figure 1:
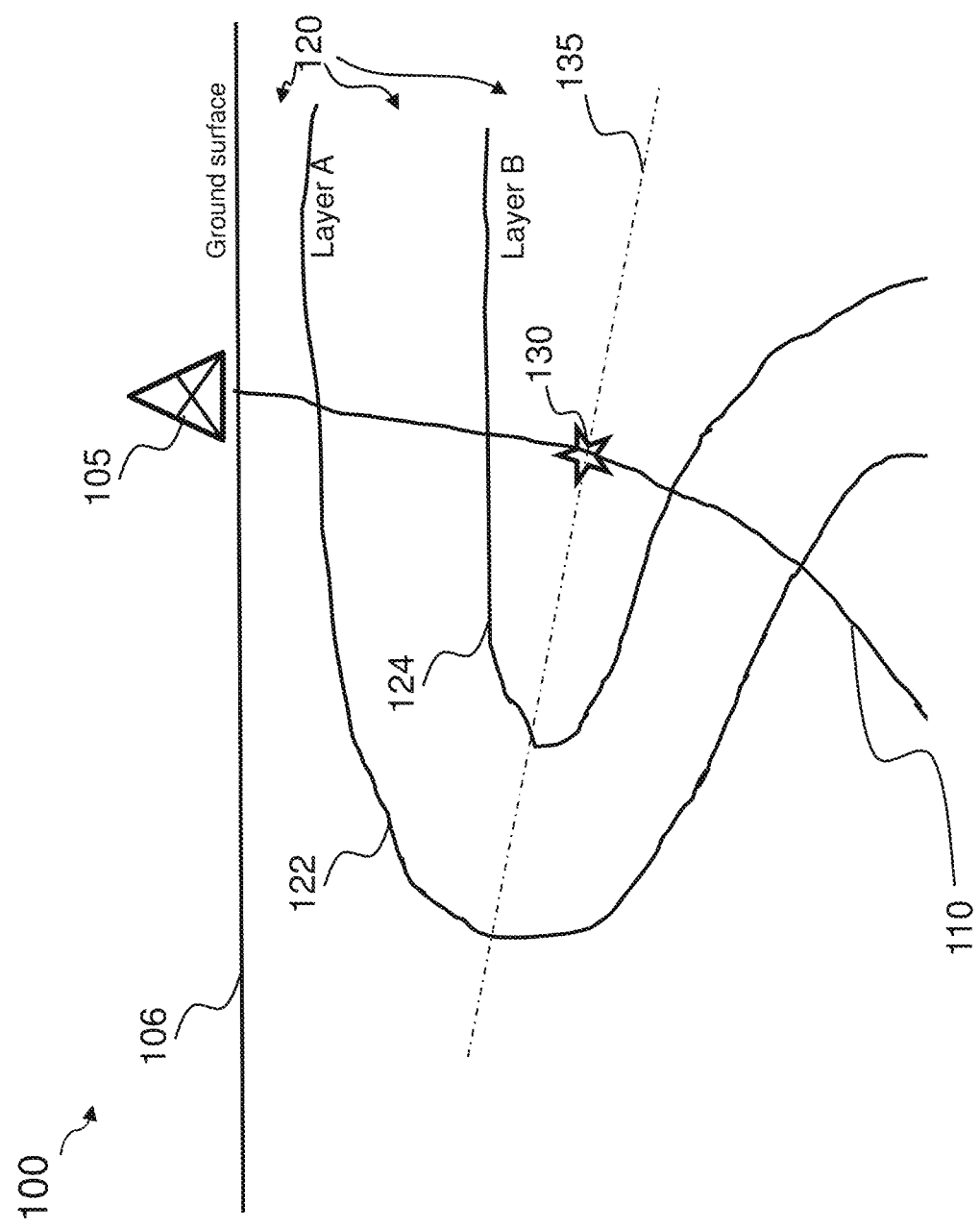
FIG. 1 is an illustration of a diagram of an example borehole system through a subterranean formation.

In borehole development, users, such as well operators or engineers, use geo-steering techniques to maintain borehole development, e.g., drilling operations, along an intended path and direction. Knowing the position of the borehole relative to nearby subterranean formation changes can be beneficial to ensure borehole distancing, separation, or borehole interception at the desired location. The borehole development can be for various uses, for example, hydrocarbon production, geothermal uses, scientific uses, mining uses, and other uses of boreholes.

One characteristic of the subterranean formation that is useful for identifying the path of a borehole is stratigraphy. The layers of the subterranean formation can be used to ensure the borehole is being developed, e.g., drilled, along the intended path.

Subsurface stratigraphy can be difficult to interpret from borehole data because a borehole path is typically not perfectly vertical and the rock strata, e.g., subterranean formation layers, are rarely perfectly horizontal layers. Borehole data can be represented in various ways to reduce the effect of an irregular borehole path. Irregular borehole paths can make it more difficult to correct for the variations in structure of the subterranean formation, such as dipping or folded strata. Borehole data can be, for example, gamma ray log curves, such as measured in API values (API is a unit of radioactivity used for measuring natural gamma rays), electrical resistivity log curves, such as measured in ohms, cuttings data as mud log or lithology intervals, or other types of borehole data.

Adjustments can be made to the borehole data for a stratigraphic interval to improve the usability of the borehole data when represented adjacent to another set of borehole data for the same stratigraphic interval. The adjustments can help correct the orientation of the borehole path relative to the subterranean formation layers, allowing the various borehole data to be compared or correlated. Improved interpretations of the subsurface stratigraphy can be made, thereby improving the identification of a hydrocarbon reservoir, improving the drilling of new boreholes along an intended path, and decreasing the risk of unexpected strata and its impact on drilling safety.

Conventionally, segmenting a borehole can be implemented by splitting the borehole into sections to enable an analysis of data in each particular section of the borehole. In some aspects, segmenting the borehole can allow selected sections of the borehole to be displayed in reverse or alongside other sections of the borehole to improve the ability to compare the data. In some aspects, boreholes are typically segmented at turning points within subterranean formation along the borehole path, e.g., where the borehole path goes above or below the horizontal plane. In some aspects, the display of the resulting sections can assist to visualize where the borehole path is compared to the layers of the subterranean formation, e.g., towards or away from the ground layer. Segmenting the borehole at the turning points can be useful in flat stratigraphy, though this segmentation scheme may not allow for the direct comparison of undulating or folded strata.

This disclosure presents processes that can identify turning points in stratigraphy (TPS), using geological rules, and then utilize the turning points to align the borehole data in the correct stratigraphic orientation and scale the borehole data according to the stratigraphic thicknesses. The processes can utilize dip parameters and azimuth parameters from layer grids to calculate a true stratigraphic thicknesses at each directional survey point (i.e., borehole survey points) along a borehole. The processes can take into account the layer type, e.g., a conformable layer type or an unconformable layer type, and whether the subterranean formation has one or more faults. A conformable layer type tends to have a definable layer surface, such as its original layer surface when deposited. An unconformable layer type tends to have part of the layer eroded away, for example, prior to other rock getting deposited on top. In some aspects, an unconformable layer can be eroded to such a degree that the orientation of the unconformable layer is effectively changed.

A TPS can be identified where the true stratigraphic thickness changes between an increasing trend value and a decreasing trend value. The turning point analysis can utilize a structural framework of layers in which the stratigraphic relationship of rock strata layers can be identified and whether a layer is conformable or unconformable, and thereby can identify which layers can be used confidently to calculate the true stratigraphic thickness (TST). In some aspects, the processes can take into account the location of one or more fault planes, and thereby identify which layers, within a stratigraphic interval, can be used to calculate the TST. The disclosed processes can calculate the TST between each directional survey point of the borehole, which can increase the detail and capture of the TST changes. Conventional methods calculate the TST only at layer intersection points.

The processes can utilize the TPS to segment and correctly orient the borehole data. These turning points can be used to segment a borehole so that data in areas of reversed stratigraphy can be aligned in the correct orientation and alongside data of the borehole that is from the same strata. This can enable an improvement in the interpretation of the strata and allow for improved understanding of the various layers of the subterranean formation.

In some aspects, the borehole data and the aligned borehole data can be displayed in a form where a user can visually compare the borehole path to the various layers of the subterranean formation. This aspect allows a user to interpret the data and make adjustments to the borehole operations. In some aspects, the borehole data can be represented within a database, data file, or other type of data structure and analyzed by a computing system.

The disclosed processes can improve stratigraphic interpretation when working in folded and faulted subterranean formation areas. These subterranean formation areas can have a complex basin history that includes upheaval and erosion. The various types of subterranean formations where the disclosed processes can be used can expand the number of geographical areas where interpretation of the layers of the subterranean formation can be improved.

In some aspects, the disclosed processes can improve the experience of users where the automatic display of borehole data in the stratigraphic domain can allow users to interpret the stratigraphy within the borehole, leading to reduced time to obtain value from the borehole data. The processes can improve interpretations of the borehole data to improve the likelihood for a successful drilling operation. The stratigraphic corrections can be made within the constraints of geological rules, ensuring that rigorous and up-to-date scientific understanding continues to underpin the processes.

In some aspects, TPS can be used to visualize the turning point as a data point to view in a section or a map, such three dimensional views to help interpretation in other workflows. In some aspects, TPS can be used to constrain how the borehole data is used to populate an earth model (for example, a petrophysical model). In some aspects, TPS can be used to control how structural models are built to identify that a layer should not cross a turning point, or the turning point should lie within a volume. A radius or sphere of influence would need to be determined. In some aspects, TPS can be used in workflows to hide repeating data in a stratigraphic interval. This aspect would use a calculation to define which part to remove. In some aspects, TPS can be used with operations (for example, drilling) workflows. In this aspect, calculating an anticipated TPS with the current borehole path trajectory can be valuable and comparing with the actual turning point while drilling can be valuable during the drilling operation. This aspect can potentially provide near real-time updates on the structural surfaces.

In some aspects, TPS can be where the borehole path changes between moving down the stratigraphic sequence (such as youngest to oldest strata) and moving up the stratigraphic sequence (such as oldest to youngest strata, e.g., reversed stratigraphy) and vice versa. The stratigraphic sequence is the order of strata in relative or absolute age. A borehole can encounter reversed stratigraphy due to changes in the borehole path, due to extreme folding that results in overturned beds, faulting, or due to a combination of borehole path changes and complex geological scenarios. Segmenting a borehole by the TPS can ensure that the data in the segments are displaying data from comparable strata. This can allow for an improved interpretation of the layers of the subterranean formation which can reduce risk during drilling and can improve hydrocarbon target success rates.

In some aspects, the TPS processes can be used for plotting and displaying borehole data in the true stratigraphic domain, such as using a geological software application. This can be useful in a display that is used for borehole correlation and can be used in a cross section. In some aspects, TPS can be used in workflows to hide repeating data in a stratigraphic interval, improve the display of a stratigraphic column against borehole data, or used to prevent duplication in petrophysical calculations on borehole data.

The disclosed processes utilize the calculation of TST along the borehole path. The TST describes the interval between two stratigraphic layers, measured perpendicular to one of the stratigraphic layers. The TST calculation can use the true vertical thickness value (TVT), azimuth parameters, and dip parameters for the stratigraphic layers to calculate the thickness. These dip and azimuth parameters can be taken from one dip parameter or layer intersection point for each stratigraphic interval, where the higher the density of the dip and azimuth data points along the borehole path the better the conversion of the borehole path to TST, e.g., the closer survey points are taken, then the resulting analysis can have a higher confidence weighting.

In some aspects, the borehole data can be scaled between the data points to display according to TST. Borehole data can use a scale relative to the cumulative TST. It can be valuable to display data in TST as this process can reduce the effect of an undulating borehole path and stratigraphic folding, thereby allowing a direct comparison of stratigraphic intervals. In some aspects, TST can be calculated using dip parameters and azimuth parameters from a layer point closest to each directional survey point on the borehole path. This can provide a better constrained TST that makes identifying trends in the change of TST, and therefore the identification of TPS points, more accurate.

When there are unconformable layers or faulting, the processes can avoid using data from those areas and use dip parameters and azimuth parameters from a conformable layer when possible. This can improve the usability of the TST calculation. In aspects where the layers of the subterranean formation is complex, such as a fault juxtaposing strata of different ages or a layer is missing from the stratigraphic sequence, the TST values can be used to calculate the TPS points because it is the trend that is important, whether the thickness is increasing or decreasing, as long as the layers maintain the stratigraphic order. In some aspects, when layers do not maintain the stratigraphic order, such as in overturned strata, then using the change in the trend of TST will not give the TPS. In some aspects, the TPS can be calculated between repeated strata to account for the borehole path and the dip of the layer above and below in case the subterranean formation fold is asymmetrical.

In some aspects, choosing a borehole path, layers, and faults can be done automatically, versus manually by a user. In some aspects, layers can mean a layer grid or framework grid. In some aspects, faults can mean a fault plane or fault grid. In some aspects, dip parameters and azimuth parameters can be taken from data within the borehole rather than the layer grid dip and azimuth. In some aspects, directional survey points are interchangeable with position log points.

Turning now to the figures, FIG. 1 is an illustration of a diagram of an example borehole system 100 through a subterranean formation 120. Borehole system 100 shows a borehole surface equipment 105, such as drilling or production equipment, at a surface 106. Borehole 110 is shown being drilled through subterranean formation 120. Subterranean formation 120 is shown with two layers, a layer 122 and a layer 124. Geological processes have caused layer 122 and layer 124 to fold part way through subterranean formation 120 such that the proper stratigraphic order near the top of borehole system 100 is maintained, and the stratigraphic order is reversed near the bottom (e.g., layer 124 is above layer 122 near the bottom of borehole system 100).

TPS 130 has been identified along the borehole path of borehole 110. TPS axis 135 is shown approximating the turning point in the strata of layer 122 and layer 124. TPS can be calculated using alternate algorithms when the layers do not follow the stratigraphic order, for example, see a step 1135 of a method 1100.

Figure 2:
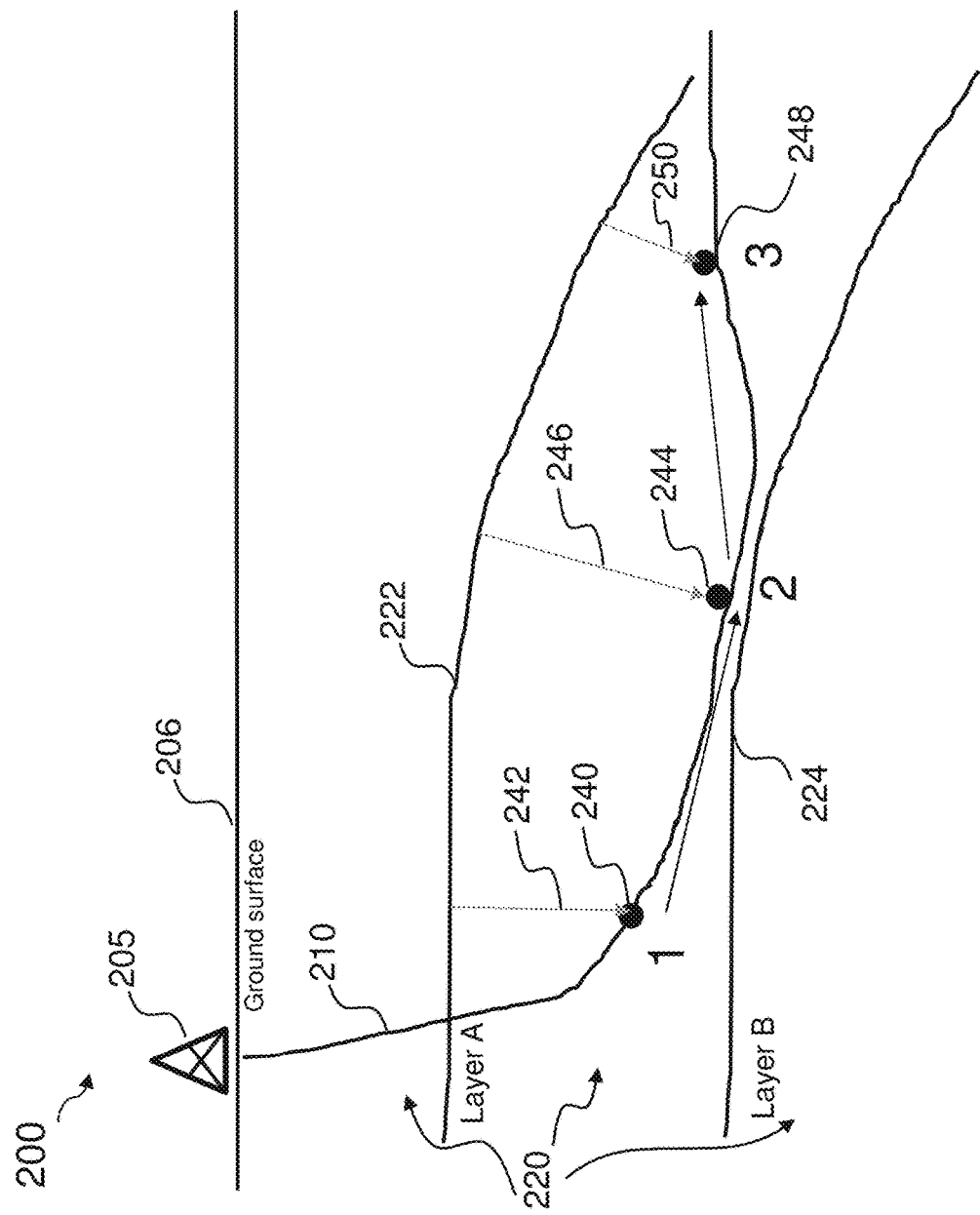
FIG. 2 is an illustration of a diagram of an example borehole system with directional survey points.

FIG. 2 is an illustration of a diagram of an example borehole system 200 with directional survey points. Borehole system 200 is similar to borehole system 100 having a surface equipment 205 at a surface 206. A borehole 210 extends below surface equipment 205 and the borehole path is through a subterranean formation 220. A layer 222 and a layer 224 maintain the stratigraphic order for the portion of the borehole path being analyzed and shown in this example. For example, the top half of layer 222 can be muddier while the bottom half of layer 222 can be sandier so confirming where the borehole path is located relative to layer 222 can be beneficial for subsequent drilling and borehole development operations.

Three directional survey points are shown. These directional survey points are locations where borehole data is collected by downhole tools. The distance between each of the directional survey points can vary, such as depending on the type of subterranean formation characteristics encountered downhole. A directional survey point 240 indicates a distance 242 of approximately 10 meters to layer 222. A directional survey point 244 indicates a distance 246 of approximately 14 meters to layer 222. A directional survey point 248 indicates a distance 250 of approximately 6 meters to layer 222. These distances are not shown to scale in borehole system 200.

Distance 242, distance 246, and distance 250 are measured as the stratigraphic thickness that is perpendicular to the respective layer. Layer 222 and layer 224 are determined from previous models, such as seismic data or other geological data. A TST difference can be calculated using the distances, for example, a first TST difference can be 14−10=4 meters, and a second TST difference can be 6−14=−8 meters. See, for example, a step 1150 of method 1100. The change from 4 meters to −8 meters can be used to determine the TPS, such as shown in a step 1155 of method 1100.

Figure 3:
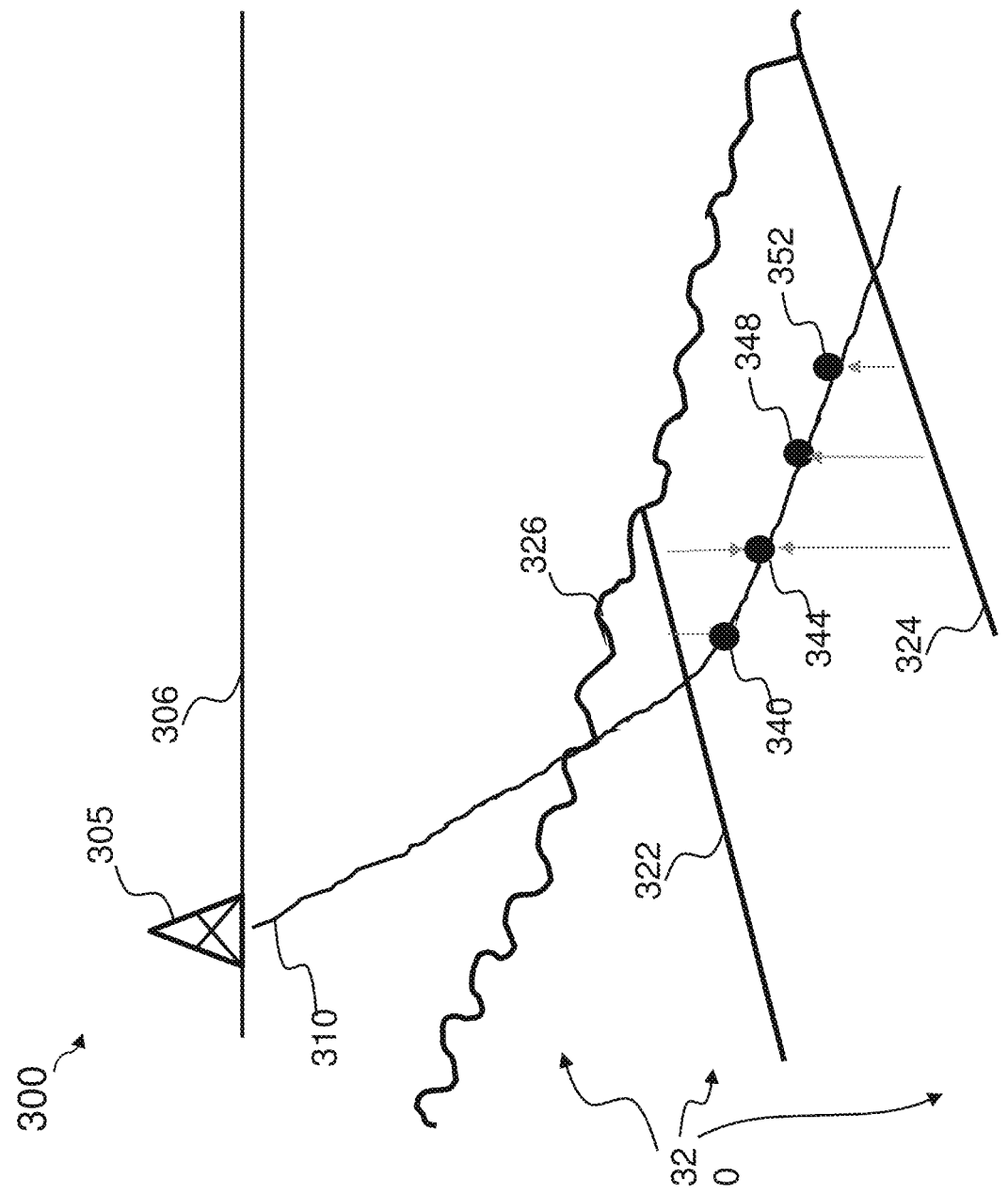
FIG. 3 is an illustration of a diagram of an example unconformable layer.

FIG. 3 is an illustration of a diagram of an example unconformable layer 300. Unconformable layer 300 is similar to borehole system 100 and borehole system 200, having a surface equipment 305 at a surface 306. A borehole 310 extends through a subterranean formation 320. In this example, a layer 322 and a layer 324 are present and are of a conformable layer type. A third layer, a layer 326, is present and is of an unconformable layer type.

A directional survey point 340 is shown determining a distance to the layer above, layer 322, since the preference is to utilize the layer above. A directional survey point 344 is shown determining a distance to the layer above, layer 322, and the layer below, layer 324. Depending on the various factors, for example, as described in a step 1140 of method 1100, one, the other, or both distances can be utilized in the further processing steps. For example, in determining the TST differences to identify the trends, adjacent directional survey points are used where the TST distance is measured to the same layer. The TST difference between directional survey point 340 and directional survey point 344 can utilize the TST distance to layer 322, while the TST difference between directional survey point 344 and a directional survey point 348 can utilize the TST distance to layer 324.

Directional survey point 348 is shown determining the distance to the layer below, layer 324, since the layer above is unconformable. An unconformable layer can make the distance estimation more difficult and therefore less reliable for the analysis. The distance estimation can be more difficult due to the layer not being at its original depositional depth and therefore can provide a less accurate result. A directional survey point 352 follows the same analysis as directional survey point 348.

FIG. 4A is an illustration of a diagram of an example fault system 400. Similar to the previous figures, fault system 400 has a surface equipment 405 at a surface 406. Extending below surface equipment 405 is a borehole 410 through a subterranean formation 420. Subterranean formation 420 has a layer 422 and a layer 424. A fault 428 runs through subterranean formation 420. When a fault crosses the borehole path, the processes can switch between the top layer to the bottom layer. Once the fault is no longer over the borehole path, the processes can switch back to using the top layer.

In fault system 400, a directional survey point 440 is shown calculating the TST from the layer above, layer 422. A directional survey point 444 is shown calculating the TST from the layer below, layer 424 since fault 428 is present above directional survey point 444. A directional survey point 448 returns to using the layer above, layer 422 to calculate the TST as fault 428 is no longer above that directional survey point.

Figure 4B:
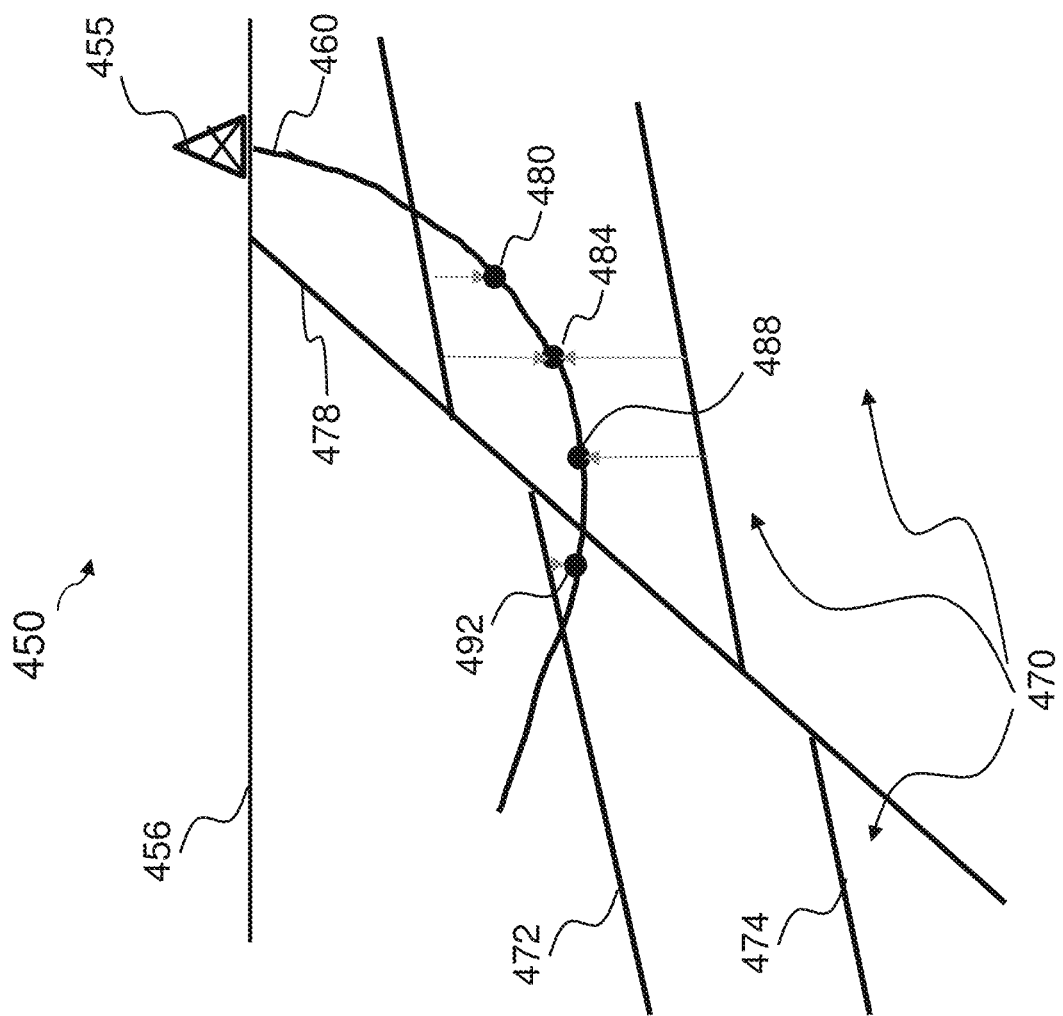
FIG. 4B is an illustration of a diagram of an example fault system with a curved borehole.

FIG. 4B is an illustration of a diagram of an example fault system 450 with a curved borehole. Similar to the previous figures, fault system 450 has a surface equipment 455 at a surface 456. Extending below surface equipment 455 is a borehole 460 through a subterranean formation 470. Subterranean formation 470 has a layer 472 and a layer 474. A fault 478 runs through subterranean formation 470.

A directional survey point 480 is calculating the TST using the layer above, layer 472. A directional survey point 484 is calculating the TST using the layer above, layer 472, and the layer below, layer 474, since the process is changing which layer is being utilized. By having the TST values, the adjacent TST difference calculations can be made in either direction of the borehole path. A directional survey point 488 is calculating the TST using the layer below, layer 474. A directional survey point 492 is calculating the TST using the layer above, layer 472, since fault 478 is no longer above the borehole path.

FIG. 5A is an illustration of a diagram of example multiple unconformable layers 500. Similar to the previous figures, multiple unconformable layers 500 has a surface equipment 505 at a surface 506. Extending below surface equipment 505 is a borehole 510 through a subterranean formation 520. Subterranean formation 520 has an unconformable layer 526 and an unconformable layer 527. A directional survey point 540 utilizes the layer above, unconformable layer 526, to calculate the TST since the available layers are unconformable. When there is an unconformable layer above and an unconformable layer below the directional survey point, the TST can be calculated from the layer above. The TST calculation can be identified as having low confidence.

Figure 5B:
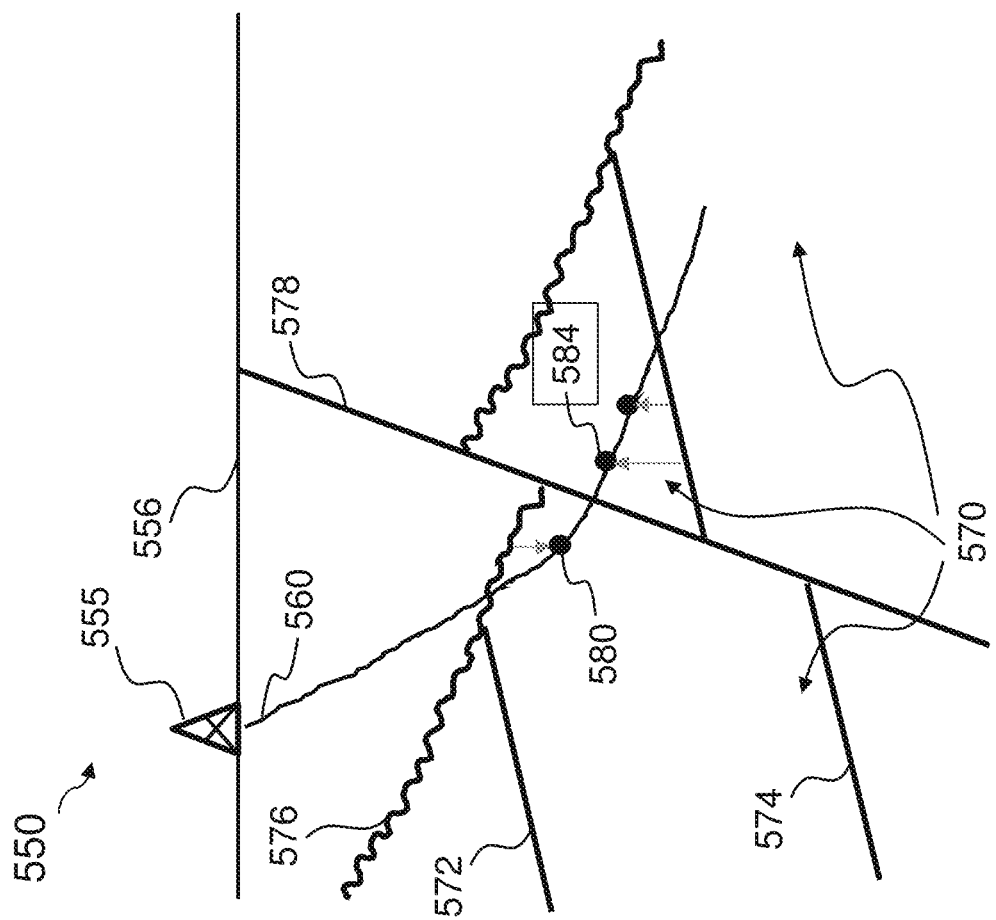
FIG. 5B is an illustration of a diagram of an example fault system with unconformable layers and conformable layers.

FIG. 5B is an illustration of a diagram of an example fault system 550 with unconformable layers and conformable layers. Similar to the previous figures, fault system 550 has a surface equipment 555 at a surface 556. Extending below surface equipment 555 is a borehole 560 through a subterranean formation 570. Subterranean formation 570 has a conformable layer 572, a conformable layer 574, and an unconformable layer 576. A fault 578 passes through subterranean formation 570. A directional survey point 580 utilizes the layer above, unconformable layer 576, to calculate the TST since fault 578 lies below unconformable layer 576. A directional survey point 584 utilizes the layer below, conformable layer 574, for the TST calculation as that is a better choice to unconformable layer 576 or fault 578. When there is an unconformable surface above and a fault below the directional survey point, the TST is calculated from the surface above, and is marked as having low confidence.

FIG. 6A is an illustration of a diagram of an example borehole system 600. Similar to the previous figures, borehole system 600 has a surface equipment 605 at a surface 606. Extending below surface equipment 605 is a borehole 610 through a subterranean formation 620. A fault 628, in this example, has caused a layer 622 to be above borehole 610 and subsequently below borehole 610 further downhole.

Layer 622, a layer 624, and a layer 626 are shifted significantly by fault 628. On the uphole side of fault 628, a directional survey point 640 calculates the TST using the layer above, layer 622. On the downhole side of fault 628, a directional survey point 644 calculates the TST using layer 622. Layer 622 on the downhole side is now below directional survey point 644. In this example, it is not an issue when the layer below the directional survey point or fault intersection is not the next layer in the stratigraphic order (in this example layer 624 is expected, while layer 622 is present) because the stratigraphic order is maintained.

Figure 6B:
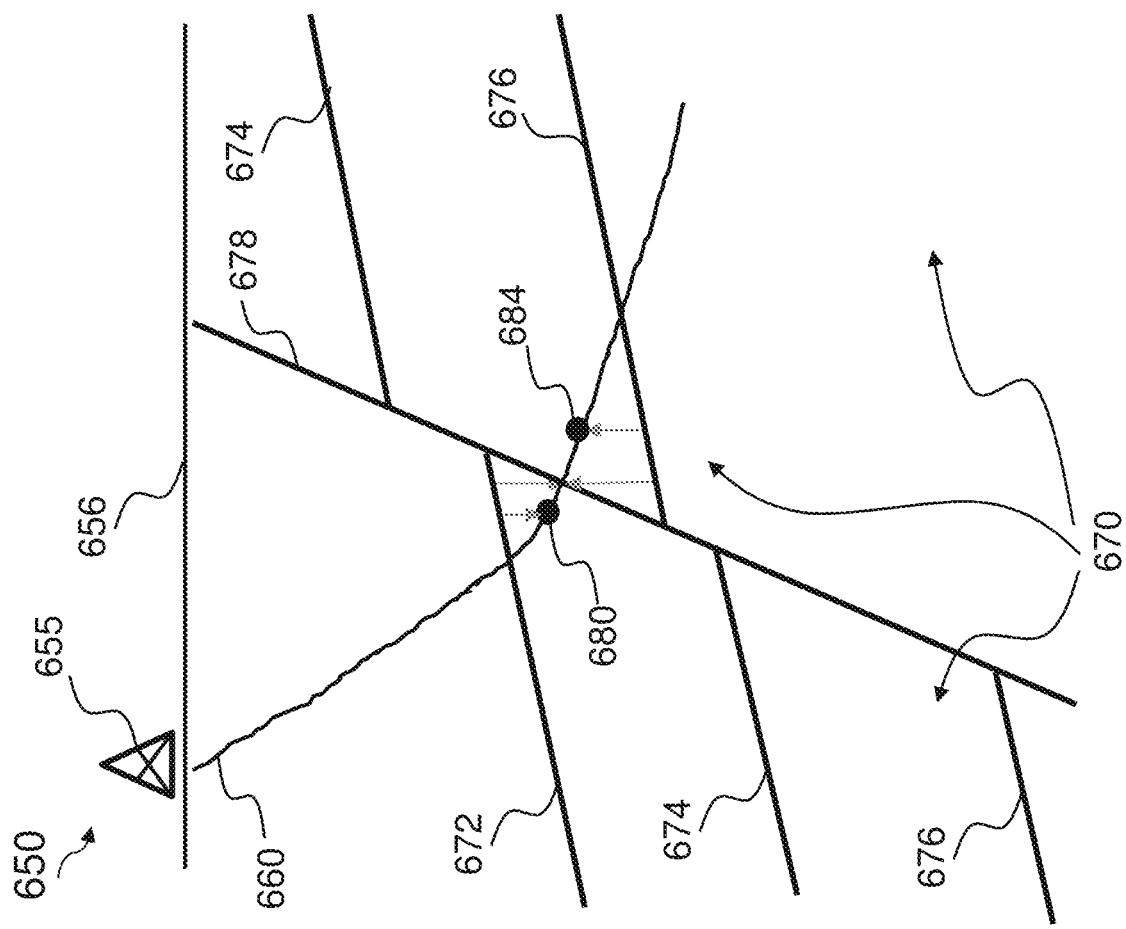
FIG. 6B is an illustration of a diagram of an example borehole system with a significant fault shift.

FIG. 6B is an illustration of a diagram of an example borehole system 650 with a significant fault shift. Similar to the previous figures, borehole system 650 has a surface equipment 655 at a surface 656. Extending below surface equipment 655 is a borehole 660 through a subterranean formation 670. A fault 678, in this example, has caused a layer 672 to be above borehole 660 uphole of fault 678 and subsequently, further downhole, a layer 674 is above borehole 660.

Layer 672, layer 674, and a layer 676 is shifted significantly by fault 678. On the uphole side of fault 628, a directional survey point 680 calculates the TST using the layer above, layer 672. On the downhole side of fault 678, a directional survey point 684 calculates the TST using layer 676 due the layer shifting and the presence of fault 678. It is not an issue when the layer below the directional survey point or fault intersection is not the next layer in the stratigraphic order (in this example layer 674 is expected, while layer 676 is present) because the stratigraphic order is maintained.

Figure 7:
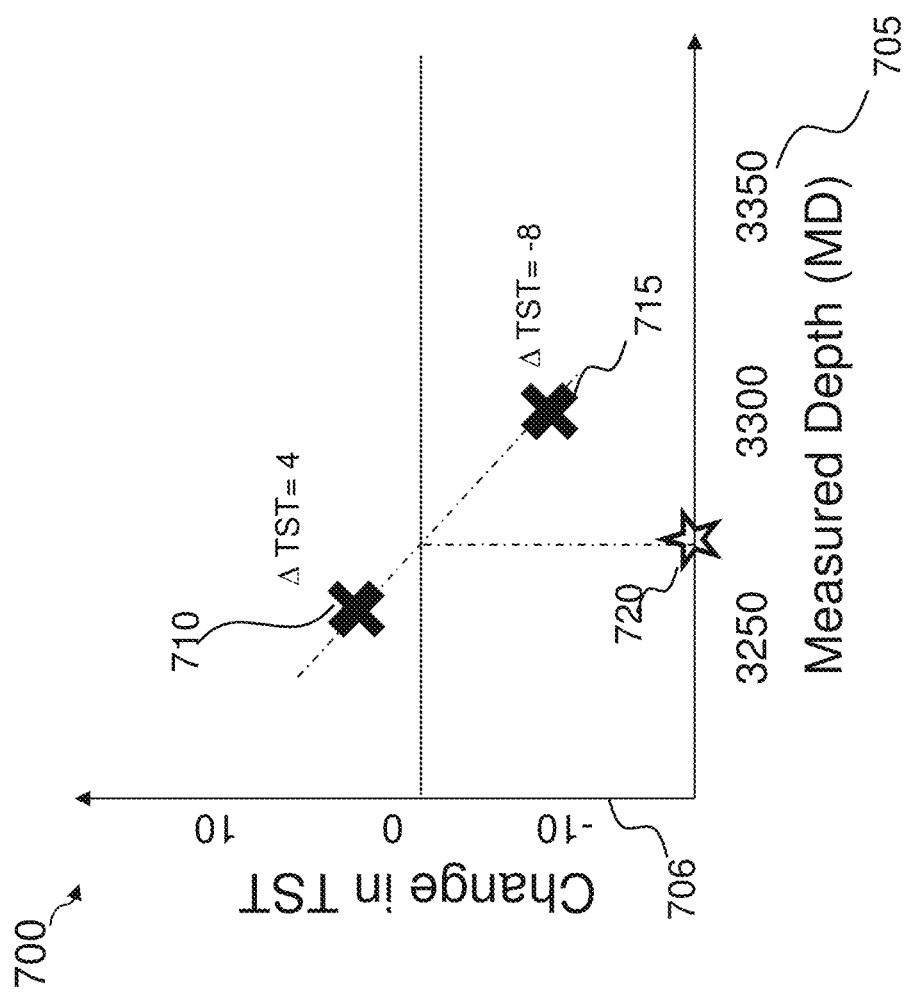
FIG. 7 is an illustration of a diagram of a chart demonstrating a linear transformation.

FIG. 7 is an illustration of a diagram of a chart 700 demonstrating a linear transformation. Using the example from FIG. 2, the TST differences can be related to each other to determine the TPS, for example, see step 1155 of method 1100. The TPS can be calculated using a linear transform from measured depth (MD) to TST. In some aspects, the algorithm can perform the linear transform in one direction, such as looking for a TPS point at deeper parts of the borehole. In some aspects, the algorithm can perform the transform in adjacent parts of the borehole, in the uphole and downhole directions, to improve the TPS identification.

Chart 700 has an x-axis 705 in MD and a y-axis 706 showing the change in TST. X-axis 705 and y-axis 706 can utilize various linear units of measure, such as feet, yards, meters, or other linear units.

Plot point 710 shows the first TST difference of 4 meters as described in FIG. 2. Plot point 715 shows the second TST difference of −8 meters as described in FIG. 2. The point at which the TST difference crosses the 0 mark on y-axis 706 is the TPS point, shown as TPS 720. TPS 720 has been dropped down to x-axis 705 to show the measured depth at which the TPS is associated. TPS 720, where the TST difference changes from positive to negative, is where the borehole representation can begin displaying data in reverse.

Figure 8:
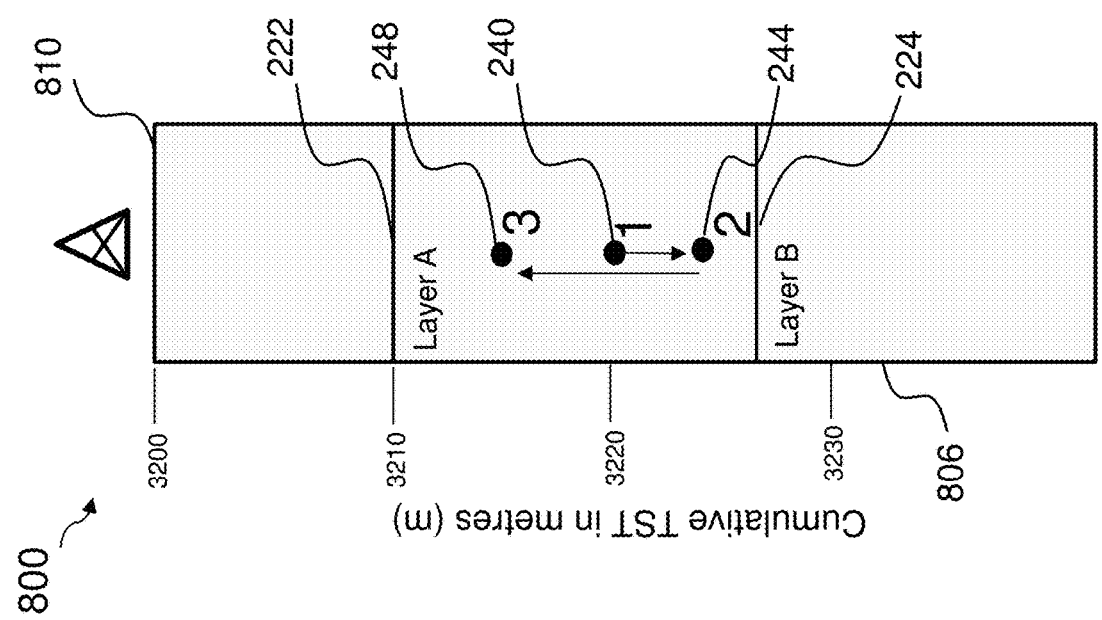
FIG. 8 is an illustration of a diagram of an example plot demonstrating a cumulative true stratigraphic thickness (TST)

FIG. 8 is an illustration of a diagram of an example plot 800 demonstrating a cumulative TST. Building on FIG. 2, FIG. 8 utilizes the data and the layers identified in FIG. 2 and plots them in a plot area 810 against a y-axis 806 using meters as the linear units. This is a visual example of what can be done by a step 1160 of method 1100.

The borehole data can be plotted in a cumulative TST display. The data from layer 222 to directional survey point 240 can be plotted with the TST value of 10 meters. There is no previous survey point so the TST difference is simply the true vertical depth (TVD) value. Then the data between directional survey point 240 and directional survey point 244 can be plotted with the difference in TST of 4 meters. Then the data between directional survey point 244 and directional survey point 248 can be plotted with the difference in TST of 8 meters (trending upwards since it is −8 meters). When the difference in TST is negative, the data needs to be reversed between the directional survey points, as shown when plotting directional survey point 248 in plot area 810.

Figure 9C:
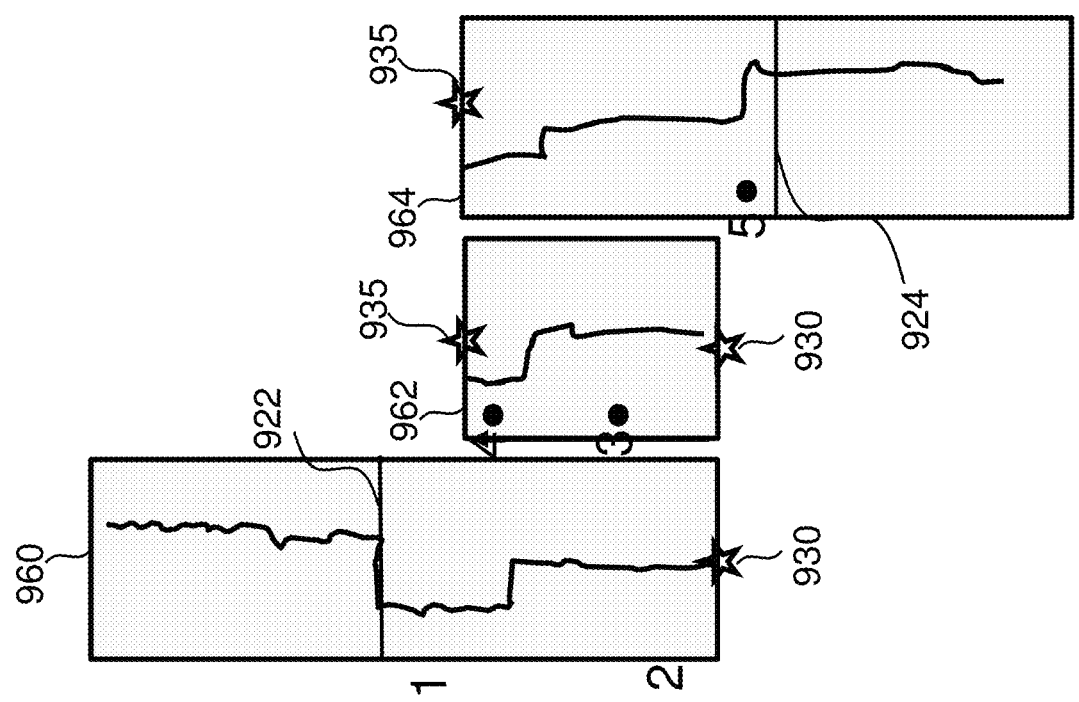
FIG. 9C is an illustration of a diagram of an example borehole data segmentation with separate visualizations.

FIGS. 9A-9C are illustrations of diagrams of an example borehole data segmentation 900. FIG. 9A demonstrates a borehole system where the data has been collected. FIG. 9A has a borehole 910 with borehole data 915 represented. Borehole data 915 demonstrates in this example one type of borehole data, such as gamma ray log curves in a range of 0-250 API. A layer 922 is shown above a layer 924 in the stratigraphic order. A TPS point 930 and a TPS point 935 have been calculated using the processes described herein.

Various directional survey points are represented by the circles on borehole 910. Spacing of the directional survey points can vary depending on the speed of drilling, the subterranean formation characteristics, the depth points, and other factors. In some aspects, the spacing of the directional survey points can be approximately 2 meters, or 5 feet. The borehole data can be collected at each directional survey point by conventional tools, such as gyros attached to the drill string, sensors, and other tools.

In FIG. 9B, a plot area 940, similar to plot area 810, can be used to visually represent borehole data 915. Once the TPS points are calculated, the borehole path can be segmented at the TPS points to improve the visualization of borehole data 915, such as where borehole data 915 is reversed (when crossing the positive/negative point for the TST differences). This has been plotted in plot area 940 as borehole data 945. Between TPS point 930 and TPS point 935, borehole data 945 has been reversed and forms a second segment. Above TPS point 935 is a first segment, and below TPS point 930 is a third segment.

In FIG. 9C, plot area 940 is pulled into three separate segments, a segment 960, a segment 962, and a segment 964. Borehole data 945 has been plotted in each respective segment so that each data line is easier visualize.

Figure 10:
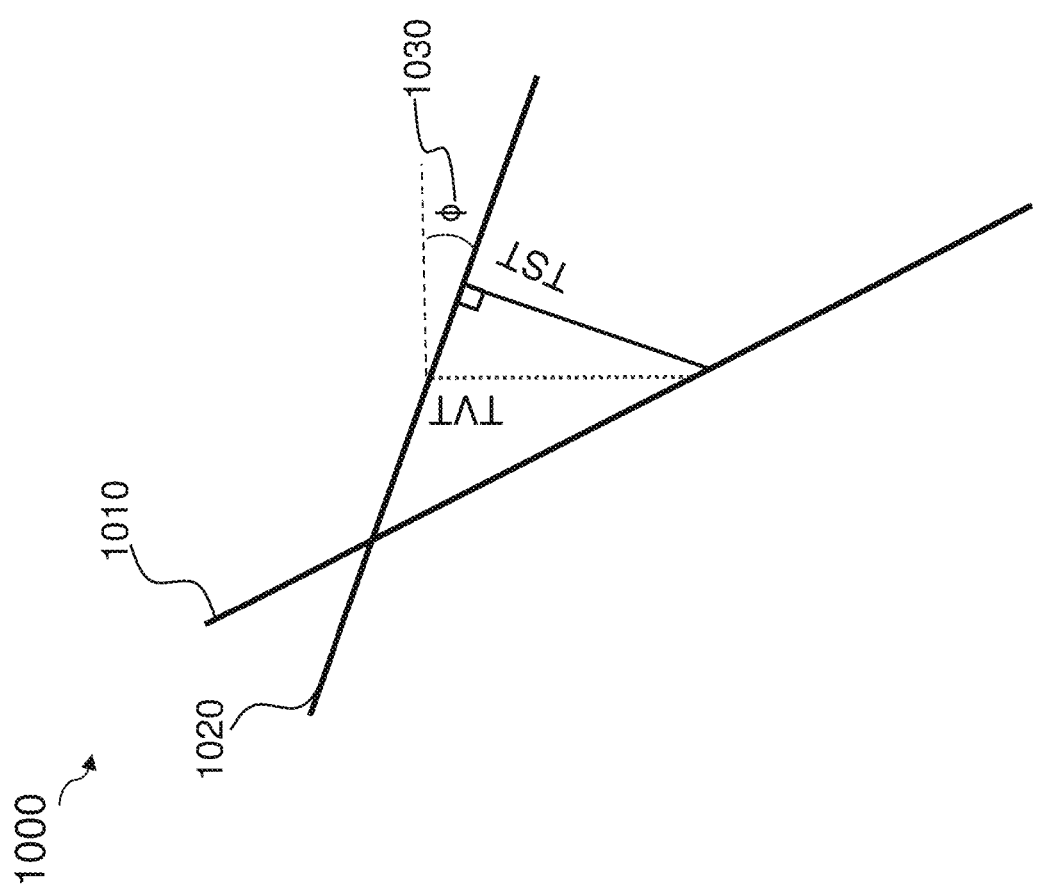
FIG. 10 is an illustration of a diagram of an example plot demonstrating a TST calculation.

FIG. 10 is an illustration of a diagram of an example plot 1000 demonstrating a TST calculation. In this aspect, a borehole 1010 is shown crossing a layer 1020. The TVT can be calculated as described herein. The TST can be calculated using the TVT and a dip angle of layer 1020, shown as angle 1030. In this aspect, $TST=TVT \cdot \cos \Phi$).

FIGS. 1, 2, 3, 4A, 4B, 5A, 5B, 6A, 6B, 7, 8, 9A, 9B, 9C, and 10 demonstrate the disclosed processes using a visual two-dimensional or three-dimensional graph, e.g., visually representing the algorithms. A visual component is not needed for the processes and is used herein to explain the processes. The processes can be performed within a computing system using the directional survey points, the borehole data and the input parameters.

Figure 11:
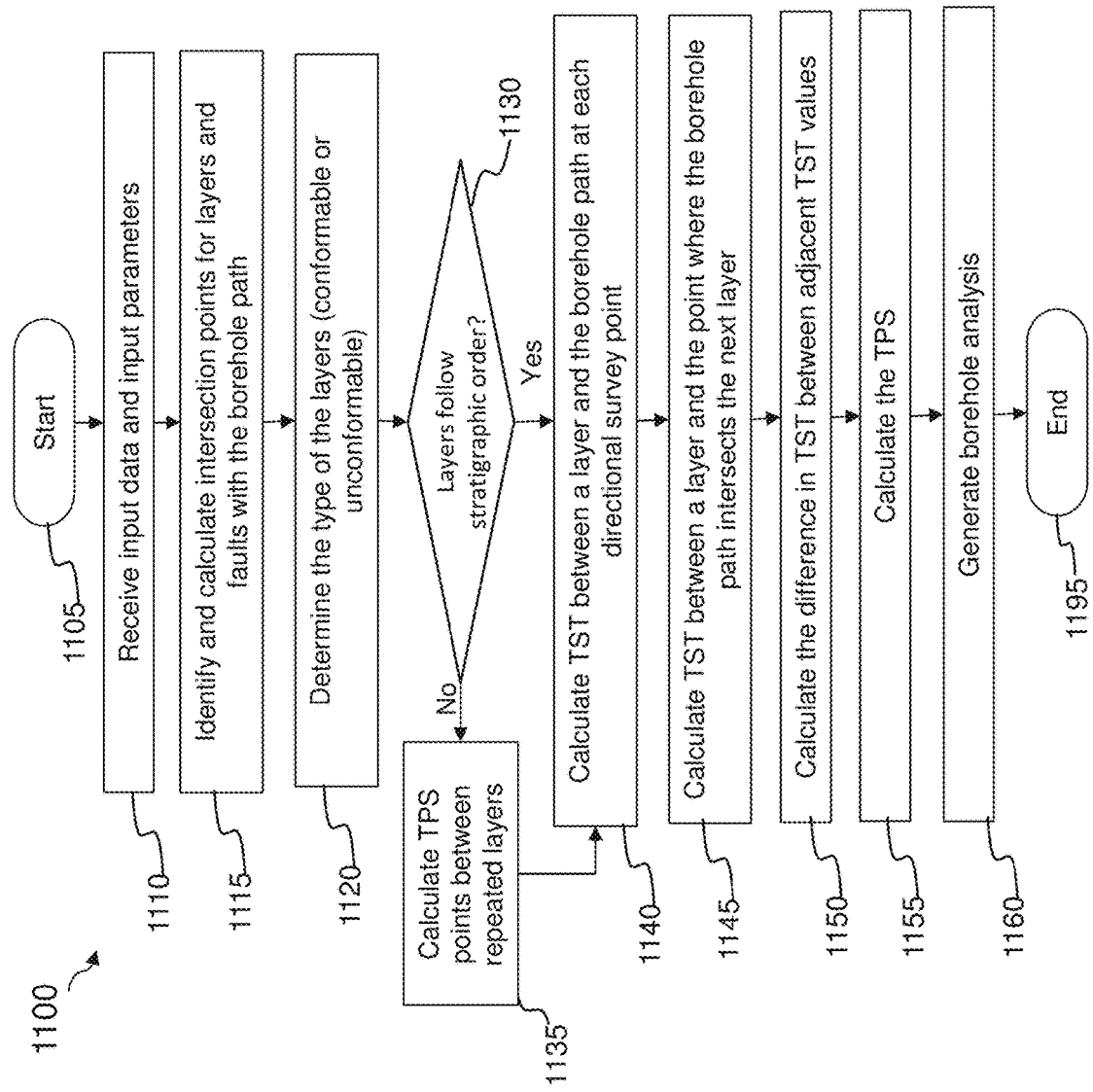
FIG. 11 is an illustration of a flow diagram of an example method to generate stratigraphic analysis.

FIG. 11 is an illustration of a flow diagram of an example method 1100 to generate stratigraphic analysis. Method 1100 can be performed on a computing system, for example, stratigraphic analyzer system 1200 of FIG. 12 or stratigraphic analyzer controller 1300 of FIG. 13. The computing system can be a reservoir controller, a well site controller, a geo-steering system, a data center, a cloud environment, a server, a laptop, a mobile device, smartphone, PDA, or other computing system capable of receiving the formation tester data, input parameters, and capable of communicating with other computing systems. Method 1100 represents an algorithm that can be encapsulated in software code or in hardware, for example, an application, code library, dynamic link library, module, function, RAM, ROM, and other software and hardware implementations. The software can be stored in a file, database, or other computing system storage mechanism, such as an edge computing system. Method 1100 can be partially implemented in software and partially in hardware. Method 1100 can perform the steps for the described processes, for example, collecting input data from the subterranean formation and analyzing the data.

Method 1100 starts at a step 1105 and proceeds to a step 1110. In step 1110, the input data and input parameters are received. For example, a specific borehole or boreholes can be selected, as well as the subterranean formation area, layers, and faults that will be focused on for the analysis. These parameters will be used to calculate, and analyze or display, data in the stratigraphic domain. The borehole survey points (i.e., the directional survey points) can be received as the input data. The received data can form a set of directional survey points where each survey point within the set can be analyzed by the described processes. In some aspects, the input data can include stratigraphic data on the layers of the subterranean formation.

In a step 1115, layers, and faults if present, which intersect the borehole path, can be identified. A calculation can be made of the intersection depths of the borehole path with the layers and faults that may be present. The order of the layers can be determined in measured depth. In a step 1120, the layer type of each layer can be determined, such as being conformable or unconformable. The identification of the layer can be different at different areas or sections of the subterranean formation. For example, a layer can be conformable when analyzing one section of the borehole path and unconformable for another section of the borehole path. A layer of the subterranean formation may change from one type to the other along the borehole path.

In a decision step 1130, the stratigraphic sequence of the layers can be determined. If the resultant is "Yes", that the layers follow the stratigraphic order, then method 1100 proceeds to a step 1140, e.g., no extra TPS points need to be calculated when the layers that intersect with the borehole path do follow the stratigraphic order. If the resultant is "No", that the layers do not follow the stratigraphic order, then method 1100 proceeds to a step 1135. In step 1135, a TPS can be calculated between the repeated layers (e.g., a repeated layer TPS) when the layers that intersect with the borehole path do not follow the stratigraphic order, i.e., there is a repeat of a layer and there is no fault intersection between the repeated layers, for example, see FIG. 1. Method 1100 proceeds to step 1140.

In step 1140, a calculation can be made for the TST between a layer and the borehole path at each directional survey point beneath the layer and above the next layer (forming a set of TST), for example, see FIG. 2. In some aspects, when the nearest layer above the directional survey point is conformable, then this layer is used to obtain the dip parameter and azimuth parameter. In some aspects, when the nearest layer above the directional survey point is unconformable then the nearest layer below the directional survey point is used to obtain the dip parameter and azimuth parameter, for example, see FIG. 3.

In some aspects, when a fault is closer than the nearest layer above the directional survey point, then the nearest layer below the directional survey point is used to obtain the dip parameter and azimuth parameter, for example, see FIG. 4A and FIG. 4B. In some aspects, when the nearest layer below the directional survey point needs to be used and it is unconformable then the nearest layer above is used to obtain the dip parameter and azimuth parameter, even though it may also be unconformable, for example, see FIG. 5A and FIG. 5B. In this aspect, the confidence of the resulting TST is lowered and, in some aspects, a warning message can be made available to a system or a user.

In some aspects, when changing between the layer above and the layer below, the last directional survey point or fault intersection point should calculate the TST from the layer above and layer below to ensure TST values are calculated along the entire length of the borehole and to capture the trend in TST changes, for example, see FIG. 6A and FIG. 6B. In some aspects, when there is no layer above the borehole path, then the TST equals the TVD. In some aspects, when the nearest layer below is to be used and there is no layer below the borehole path, then the TST equals the TVT. In some aspects, when the angle to the nearest layer is greater than 45 degrees)(° then a simplified TST calculation that does not take into account the offset can be used, for example, TVT=measured thickness–distance from layer to the directional survey point.

In a step 1145, the TST between a layer and the point where the borehole path intersects the next layer can be calculated, when this point does not lie at a directional survey point. For example, an intersection point in the set of intersection points occurs along the borehole path prior to a subsequent directional survey point in the set of directional survey points then calculating an intersection TST at the intersection point and including the intersection TST in the set of TST.

In a step 1150, the difference in TST values from adjacent TST values can be calculated. The differences can be calculated between each adjacent pair of TST values, where the adjacency is determined by the location where the TST was calculated along the borehole path, thereby forming a set of TST differences. The differences can be used to generate a trend line of the layers of the subterranean formation.

In a step 1155, the TPS can be calculated where the differences in TST changes from positive to negative, or from negative to positive, for example, see FIG. 7. There can be multiple TPS in a borehole, such as forming a set of TPS. The previously calculated repeated layer TPS from step 1135 are included in the set of TPS.

In a step 1160, a borehole analysis of the data can be generated. In some aspects, the borehole data can be plotted on a display for a user, such as with cumulative TST on the Z axis. The data, from a layer intersection to the first directional survey point after the layer, can be plotted according to the TST value calculated at that directional survey point. The data, from the first directional survey point after the layer to the second directional survey point after the layer, can be plotted within the difference in TST from the first directional survey point to the second directional survey point. If the difference in TST is negative then the data is plotted in reverse, for example, see FIG. 8.

In some aspects, when there is a TPS between the directional survey points then the data direction is to be reversed at the TPS. In some aspects, the borehole can be segmented at the TPS and the segments can be displayed alongside each other according to the cumulative TST scale, for example, see FIGS. 9A, 9B, and 9C.

In some aspects of step 1160, the analysis of the data can be generated within a computing system, such as a well site controller, without a visual display component. The results of the analysis, such as the turning points and the segmentation of the borehole can be communicated to other systems and used for further analysis and decisions. Method 1100 ends at a step 1195.

Figure 12:
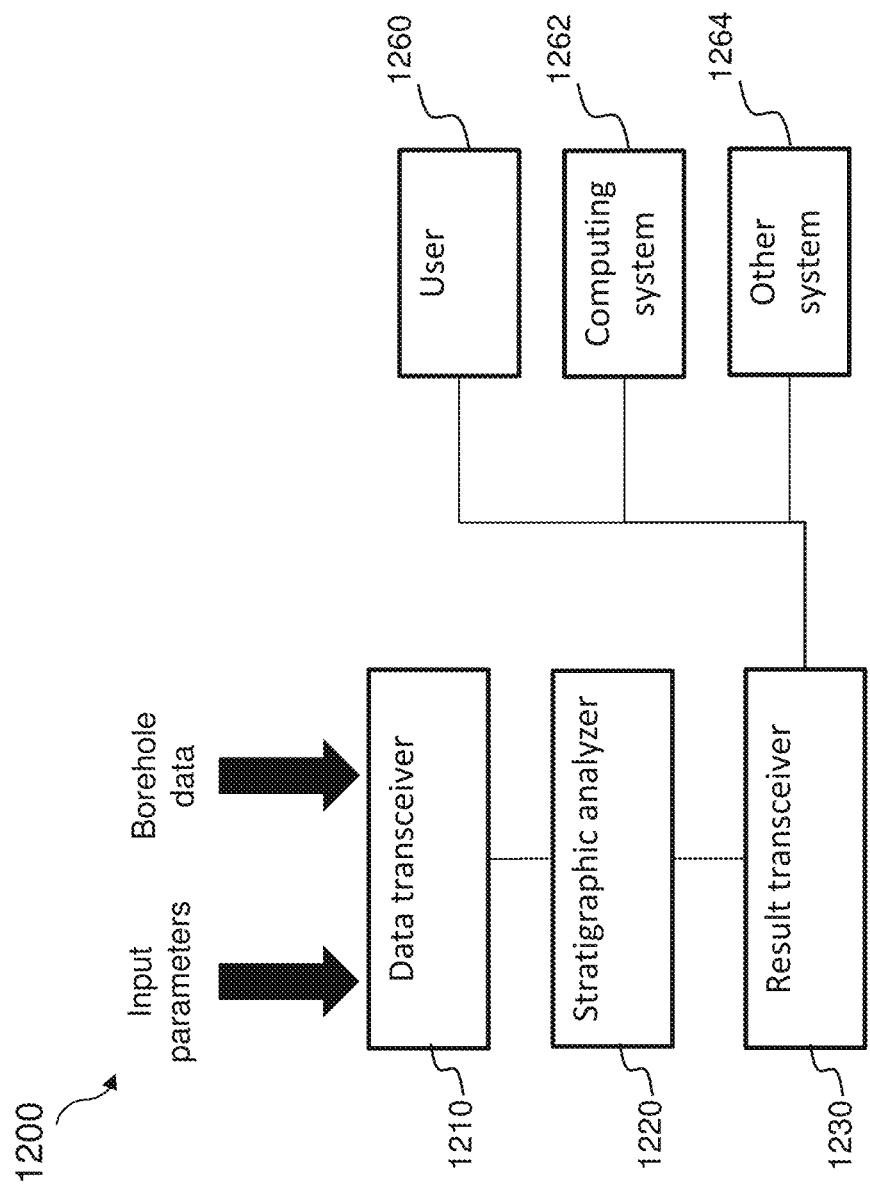
FIG. 12 is an illustration of a block diagram of an example stratigraphic analyzer system.

FIG. 12 is an illustration of a block diagram of an example stratigraphic analyzer system 1200, which can be implemented in one or more computing systems, for example, a data center, cloud environment, server, laptop, smartphone, tablet, and other computing systems. In some aspects, stratigraphic analyzer system 1200 can be implemented using a stratigraphic analyzer controller such as stratigraphic analyzer controller 1300 of FIG. 13. Stratigraphic analyzer system 1200 can implement one or more methods of this disclosure, such as method 1100 of FIG. 11.

Stratigraphic analyzer system 1200, or a portion thereof, can be implemented as an application, a code library, a dynamic link library, a function, a module, other software implementation, or combinations thereof. In some aspects, stratigraphic analyzer system 1200 can be implemented in hardware, such as a ROM, a graphics processing unit, or other hardware implementation. In some aspects, stratigraphic analyzer system 1200 can be implemented partially as a software application and partially as a hardware implementation. Stratigraphic analyzer system 1200 shows components that perform functions of the disclosed processes and an implementation can combine or separate at least some of the described functions in one or more software or hardware systems.

Stratigraphic analyzer system 1200 includes a data transceiver 1210, a stratigraphic analyzer 1220, and a result transceiver 1230. Data transceiver 1210, stratigraphic analyzer 1220, and result transceiver 1230 can be, or can include, conventional interfaces configured for transmitting and receiving data.

Data transceiver 1210 can receive input parameters, such as parameters to direct the operation of the analysis implemented by stratigraphic analyzer 1220, such as identifying which algorithms to utilize and specifying operational parameters. In some aspects, data transceiver 1210 can be part of stratigraphic analyzer 1220.

Stratigraphic analyzer 1220 can be a stratigraphic processor and can implement the analysis and algorithms as described herein utilizing the borehole data and the input parameters. For example, stratigraphic analyzer 1220 can perform the analysis of the borehole data and layers of the subterranean formation to generate the TPS and segmentation of the borehole path, and communicate the results to other systems, such as a reservoir planning system, a drilling planning system, a geo-steering system, or other well site systems. In some aspects, stratigraphic analyzer 1220 can be a machine learning system, such as providing a process to analyze the collected borehole data and subterranean formation stratigraphy against previously collected data to provide a quality check on the data and to fill in potential gaps in the data.

A memory or data storage of stratigraphic analyzer 1220 can be configured to store the processes and algorithms for directing the operation of stratigraphic analyzer 1220. Stratigraphic analyzer 1220 can also include one or more processors that is configured to operate according to the analysis operations and algorithms disclosed herein, and an interface to communicate (transmit and receive) data.

Result transceiver 1230 can communicate one or more results, analysis, or interim outputs, to one or more data receivers, such as user or user system 1260, computing system 1262, or other systems 1264 for processing or storing data, e.g., a data store or database, whether located proximate result transceiver 1230 or distant from result transceiver 1230. The results, e.g., a determination of the TPS and the segmentation of the borehole path, interim outputs from stratigraphic analyzer 1220, and the borehole data representation, can be communicated to one or more of the data receivers for processing or storing data. The results can be used, for example, as inputs into a reservoir operation plan, a drilling plan, to determine the directions provided to a geo-steering system, or used as inputs into a well site controller or other borehole system, such as a well site operation planning system.

Figure 13:
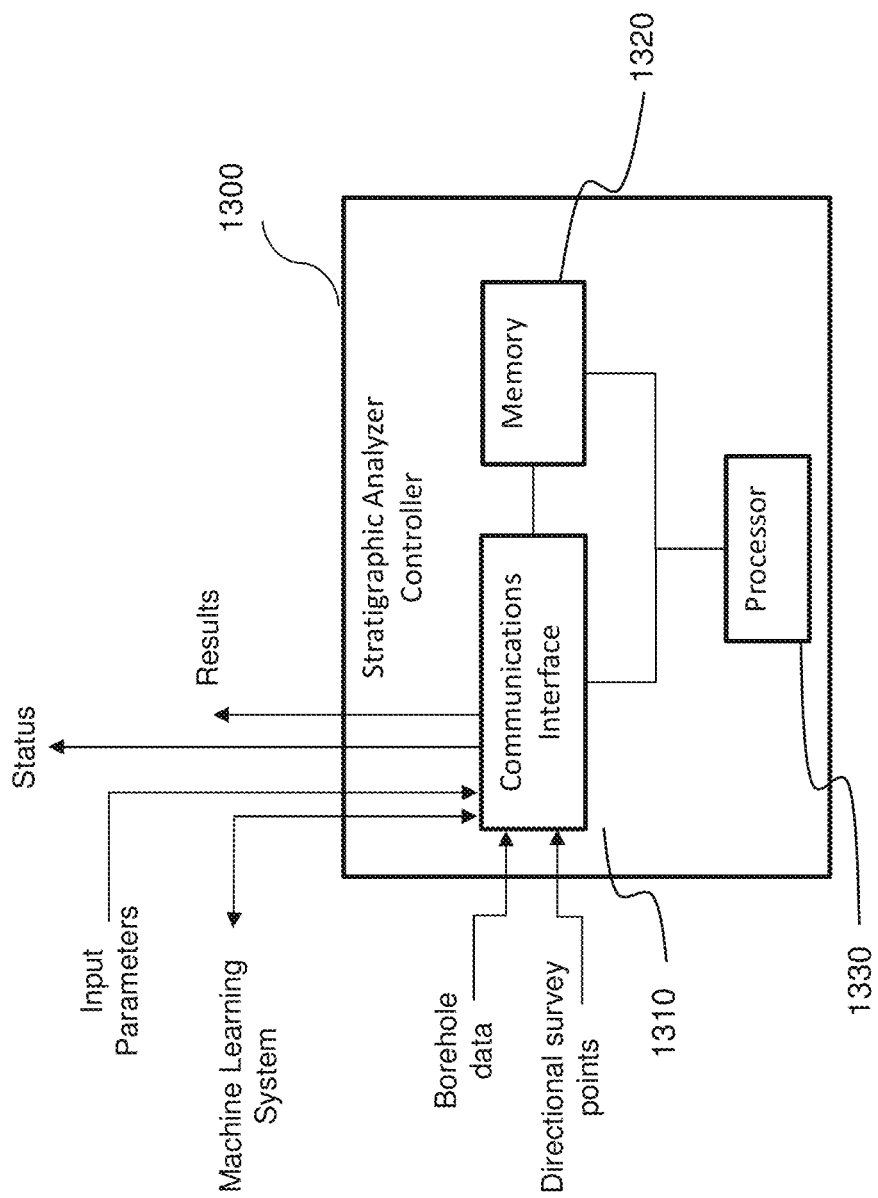
FIG. 13 is an illustration of a block diagram of an example of stratigraphic analyzer controller according to the principles of the disclosure.

FIG. 13 is an illustration of a block diagram of an example of stratigraphic analyzer controller 1300 according to the principles of the disclosure. Stratigraphic analyzer controller 1300 can be stored on a single computer or on multiple computers. The various components of stratigraphic analyzer controller 1300 can communicate via wireless or wired conventional connections. A portion or a whole of stratigraphic analyzer controller 1300 can be located at one or more locations, such as a data center, a reservoir controller, an edge computing system, a cloud environment, a server, a laptop, a smartphone, or other locations. In some aspects, stratigraphic analyzer controller 1300 can be wholly located at a downhole, a surface or distant location. In some aspects, stratigraphic analyzer controller 1300 can be part of another system, and can be integrated in a single device, such as a part of a reservoir operation planning system, a well site controller, a geo-steering system, or other borehole system.

Stratigraphic analyzer controller 1300 can be configured to perform the various processes disclosed herein including receiving input parameters and borehole data, and generating results from an execution of the methods and processes described herein, such as generating TPS and segmentation of the borehole path. Stratigraphic analyzer controller 1300 includes a communications interface 1310, a memory 1320, and one or more processors represented by a processor 1330.

Communications interface 1310 is configured to transmit and receive data. For example, communications interface 1310 can receive the input parameters, borehole data, and directional survey points. Communications interface 1310 can transmit the generated results, data from the input files, or interim outputs. In some aspects, communications interface 1310 can transmit a status, such as a success or failure indicator of stratigraphic analyzer controller 1300 regarding receiving the various inputs, transmitting the generated results, or producing the generated results.

In some aspects, communications interface 1310 can receive input parameters from a machine learning system, for example, where the borehole data is processed using one or more filters and algorithms prior to determining the TPS.

In some aspects, the machine learning system can be implemented by processor 1330 and perform the operations as described by stratigraphic analyzer 1220. Communications interface 1310 can communicate via communication systems used in the industry. For example, wireless or wired protocols can be used. Communication interface 1310 is capable of performing the operations as described for data transceiver 1210 and result transceiver 1230 of FIG. 12.

Memory 1320 can be configured to store a series of operating instructions that direct the operation of processor 1330 when initiated, including the code representing the algorithms used for processing the collected data. Memory 1320 is a non-transitory computer readable medium. Multiple types of memory can be used for data storage and memory 1320 can be distributed.

Processor 1330, e.g., a fault segment processor or a stratigraphic processor, can be configured to produce the generated results, e.g., the TPS and segmentation of the borehole path, one or more interim outputs, and statuses utilizing the received inputs. Processor 1330 can be configured to direct the operation of stratigraphic analyzer controller 1300. Processor 1330 includes the logic to communicate with communications interface 1310 and memory 1320, and perform the functions described herein, such as functions according to method 1100. Processor 1330 is capable of performing or directing the operations as described by stratigraphic analyzer 1220 of FIG. 12.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY can have one or more of the following additional elements in combination. Element 1: communicating, using a result transceiver, the set of TPS to a reservoir system, a drilling system, a geo-steering system, or a well site system. Element 2: wherein the one or more layers do not follow a stratigraphic order. Element 3: calculating a repeated layer TPS between repeated layers of the one or more layers, and adding the repeated layer TPS to the set of TPS. Element 4: wherein an intersection point in the set of intersection points occurs along the borehole path prior to a subsequent directional survey point in the set of directional survey points. Element 5: calculating an intersection TST at the intersection point and including the intersection TST in the set of TST. Element 6: wherein each of the TPS in the set of TPS is determined when the TST difference in the set of TST differences changes from one of a positive difference or a negative difference, to the other. Element 7: wherein the calculating the TST utilizes a dip parameter and an azimuth parameter of the selected layer and respective of the directional survey point. Element 8: wherein the calculating the TST utilizes a first nearest layer above a directional survey point of interest, where the first nearest layer above is in the one or more layers, the directional survey point of interest is in the set of directional survey points, and the first nearest layer above has a layer type of conformable. Element 9: wherein the calculating the TST utilizes a first nearest layer below a directional survey point of interest, where the first nearest layer below is in the one or more layers, the directional survey point of interest is in the set of directional survey points, and a second nearest layer above has a layer type of unconformable. Element 10: wherein the calculating the TST utilizes a first nearest layer below a directional survey point of interest, where the first nearest layer below is in the one or more layers, the directional survey point of interest is in the set of directional survey points, and a fault above is closer to the directional survey point of interest than a second nearest layer above, and the first nearest layer below is conformable. Element 11: wherein the calculating the TST utilizes a first nearest layer above a directional survey point of interest, where the first nearest layer above is in the one or more layers, the directional survey point of interest is in the set of directional survey points, and a fault is closer to the directional survey point of interest than the first nearest layer above, and a second nearest layer below the directional survey point of interest is unconformable. Element 12: wherein the calculating the TST utilizes a first nearest layer below a directional survey point of interest and a second nearest layer above the directional survey point of interest, where the first nearest layer below and the second nearest layer above are in the one or more layers, the directional survey point of interest is in the set of directional survey points, and the selected layer is changing from using one of the first nearest layer below or the second nearest layer above to a respective other. Element 13: wherein the calculating the TST sets the TST equal to a TVD parameter when one of a first nearest layer above is to be used and the first nearest layer above is not determinable for a directional survey point of interest, or a second nearest layer below is to be used and the second nearest layer below is not determinable for the directional survey point of interest, and the first nearest layer above and the second nearest layer below are in the one or more layers, and the directional survey point of interest is in the set of directional survey points. Element 14: wherein the calculating the TST utilizes a calculation of TST equal to a measured thickness minus a distance from a first nearest layer to a directional survey point of interest, where an angle between the borehole path and the first nearest layer is greater than forty-five degrees, the first nearest layer is in the one or more layers, and the directional survey point of interest is in the set of directional survey points. Element 15: generating a borehole analysis using the set of TPS and the set of TST, wherein the borehole analysis includes determining segmentation of the borehole path. Element 16: wherein the borehole analysis is scaled using a cumulative TST scale. Element 17: wherein the set of TPS is used to generate a display of the borehole path and the subterranean formation, where the borehole path is segmented using the set of TPS and each segment of the borehole path is aligned using the set of TST. Element 18: wherein the TST difference in the set of TST differences is negative and borehole data for a segment is displayed in reverse order. Element 19: a machine learning system, capable of communicating with the data transceiver and the stratigraphic processor, performing an analysis of the set of directional survey points and a stratigraphy of the subterranean formation, and generating a modified set of directional survey points. Element 20: a result transceiver, capable of communicating the set of TPS and a borehole path segmentation, and interim outputs, to a user system, a data store, or a computing system. Element 21: wherein the computing system is a geo-steering system and the geo-steering system utilizes the set of TPS to adjust drilling operations. Element 22: wherein the stratigraphic processor is further capable of generating a display of the set of TPS, a borehole path segmentation, and the subterranean formation using the set of TSTs and the set of TPS.

What is claimed is:

1. A method, comprising:
   receiving a set of directional survey points and input parameters, wherein the set of directional survey points is collected from a borehole along a borehole path, and the input parameters include stratigraphic data on one or more layers of a subterranean formation where the borehole path is through the subterranean formation;
   calculating a set of intersection points of the borehole path and the one or more layers of the subterranean formation;
   determining a layer type of each layer in the one or more layers of the subterranean formation, wherein at least one layer in the one or more layers has a layer type that is unconformable;
   calculating a true stratigraphic thickness (TST), using the layer type, between a selected layer of the one or more layers and the borehole path, wherein one or more of the TST is calculated at each directional survey point in the set of directional survey points forming a set of TST;
   computing a TST difference between adjacent TSTs in the set of TST forming a set of TST differences, wherein the adjacent TSTs are determined using a location for each of the TST along the borehole path, where the location is determined using the set of directional survey points;
   generating a set of turning points in stratigraphy (TPS) using the set of TST differences where a linear transformation from a measured depth to each TST difference in the set of TST differences is used to calculate the set of TPS; and
   adjusting an angle or a direction of a geo-steering system, using the set of TPS, to adjust an orientation of the borehole path relative to the set of TPS.

2. The method as recited in claim 1, further comprising:
   communicating, using a result transceiver, the set of TPS to a reservoir system, a drilling system, a geo-steering system, or a well site system.

3. The method as recited in claim 1, wherein the one or more layers do not follow a stratigraphic order, further comprising:
   calculating a repeated layer TPS between repeated layers of the one or more layers, and adding the repeated layer TPS to the set of TPS.

4. The method as recited in claim 1, wherein an intersection point in the set of intersection points occurs along the borehole path prior to a subsequent directional survey point in the set of directional survey points, further comprising:
   calculating an intersection TST at the intersection point and including the intersection TST in the set of TST.

5. The method as recited in claim 1, wherein each of the TPS in the set of TPS is determined when the TST difference in the set of TST differences changes from one of a positive difference or a negative difference, to the other.

6. The method as recited in claim 1, wherein the calculating the TST utilizes a dip parameter and an azimuth parameter of the selected layer and respective of the directional survey point.

7. The method as recited in claim 1, wherein the calculating the TST utilizes a first nearest layer above a directional survey point of interest, where the first nearest layer above is in the one or more layers, the directional survey point of interest is in the set of directional survey points, and the first nearest layer above has a layer type of conformable.

8. The method as recited in claim 1, wherein the calculating the TST utilizes a first nearest layer below a directional survey point of interest, where the first nearest layer below is in the one or more layers, the directional survey point of interest is in the set of directional survey points, and a second nearest layer above has a layer type of unconformable.

9. The method as recited in claim 1, wherein the calculating the TST utilizes a first nearest layer below a directional survey point of interest, where the first nearest layer below is in the one or more layers, the directional survey point of interest is in the set of directional survey points, and a fault above is closer to the directional survey point of interest than a second nearest layer above, and the first nearest layer below is conformable.

10. The method as recited in claim 1, wherein the calculating the TST utilizes a first nearest layer above a directional survey point of interest, where the first nearest layer above is in the one or more layers, the directional survey point of interest is in the set of directional survey points, and a fault is closer to the directional survey point of interest than the first nearest layer above, and a second nearest layer below the directional survey point of interest is unconformable.

11. The method as recited in claim 1, wherein the calculating the TST utilizes a first nearest layer below a directional survey point of interest and a second nearest layer above the directional survey point of interest, where the first nearest layer below and the second nearest layer above are in the one or more layers, the directional survey point of interest is in the set of directional survey points, and the selected layer is changing from using one of the first nearest layer below or the second nearest layer above to a respective other.

12. The method as recited in claim 1, wherein the calculating the TST sets the TST equal to a true vertical depth (TVD) parameter when one of a first nearest layer above is to be used and the first nearest layer above is not determinable for a directional survey point of interest, or a second nearest layer below is to be used and the second nearest layer below is not determinable for the directional survey point of interest, the first nearest layer above and the second nearest layer below are in the one or more layers, and the directional survey point of interest is in the set of directional survey points.

13. The method as recited in claim 1, wherein the calculating the TST utilizes a calculation of TST equal to a measured thickness minus a distance from a first nearest layer to a directional survey point of interest, where an angle between the borehole path and the first nearest layer is greater than forty-five degrees, the first nearest layer is in the one or more layers, and the directional survey point of interest is in the set of directional survey points.

14. The method as recited in claim 1, further comprising:
generating a borehole analysis using the set of TPS and the set of TST, wherein the borehole analysis includes determining segmentation of the borehole path.

15. The method as recited in claim 14, wherein the borehole analysis is scaled using a cumulative TST scale.

16. The method as recited in claim 1, wherein the set of TPS is used to generate a display of the borehole path and the subterranean formation, where the borehole path is segmented using the set of TPS and each segment of the borehole path is aligned using the set of TST.

17. The method as recited in claim 16, wherein the TST difference in the set of TST differences is negative and borehole data for a segment is displayed in reverse order.

18. A system, comprising:
a data transceiver, capable of receiving a set of directional survey points and input parameters, wherein the set of directional survey points is collected along a borehole path of a borehole, where the borehole path is located through a subterranean formation; and
a stratigraphic processor, capable of communicating with the data transceiver, calculating intersection points between the borehole and one or more layers of the subterranean formation, determining layer types of the one or more layers where at least one layer in the one or more layers has a layer type that is unconformable, calculating a set of true stratigraphic thicknesses (TSTs) between a layer of the one or more layers and each directional survey point in the set of directional survey points, calculating a set of TST differences using the set of TSTs that are adjacent, calculating a set of turning points in stratigraphy (TPS) using the set of TST differences and the input parameters, a linear transformation from a measured depth to each TST difference in the set of TST differences is used to calculate the set of TPS, and wherein an adjustment to an angle or a direction of a geo-steering system is made, using the set of TPS, to adjust an orientation of the borehole path relative to the set of TPS.

19. The system as recited in claim 18, further comprising:
a machine learning system, capable of communicating with the data transceiver and the stratigraphic processor, performing an analysis of the set of directional survey points and a stratigraphy of the subterranean formation, and generating a modified set of directional survey points.

20. The system as recited in claim 18, further comprising:
a result transceiver, capable of communicating the set of TPS and a borehole path segmentation, and interim outputs, to a user system, a data store, or a computing system.

21. The system as recited in claim 20, wherein the computing system is a geo-steering system and the geo-steering system utilizes the set of TPS to adjust drilling operations.

22. The system as recited in claim 18, wherein the stratigraphic processor is further capable of generating a display of the set of TPS, a borehole path segmentation, and the subterranean formation using the set of TSTs and the set of TPS.

23. A computer program product having a series of operating instructions stored on a non-transitory computer-readable medium that directs a data processing apparatus when executed thereby to perform operations to determine one or more turning points in stratigraphy (TPS), the operations comprising:
receiving a set of directional survey points and input parameters, wherein the set of directional survey points is collected from a borehole along a borehole path, and the input parameters include stratigraphic data on one or more layers of a subterranean formation where the borehole path is through the subterranean formation;
calculating a set of intersection points of the borehole path and the one or more layers of the subterranean formation;
determining a layer type of each layer in the one or more layers of the subterranean formation, wherein at least one layer in the one or more layers has a layer type that is unconformable;
calculating a true stratigraphic thickness (TST), using the layer type, between a selected layer of the one or more layers and the borehole path, wherein one or more of the TST is calculated at each directional survey point in the set of directional survey points forming a set of TST;
computing a TST difference between adjacent TSTs in the set of TST forming a set of TST differences, wherein the adjacent TSTs are determined using a location for each of the TST along the borehole path, where the location is determined using the set of directional survey points;
generating a set of TPS using the set of TST differences where a linear transformation from a measured depth to each TST difference in the set of TST differences is used to calculate the set of TPS; and
communicating an adjustment to an angle or a direction of a geo-steering system, using the set of TPS, to adjust an orientation of the borehole path relative to the set of TPS.

* * * * *